(12) United States Patent
Bosch et al.

(10) Patent No.: US 7,578,225 B2
(45) Date of Patent: Aug. 25, 2009

(54) SMOKE GENERATOR MACHINE

(75) Inventors: Garrett Eugene Bosch, Yakima, WA (US); Gary Eugene Bosch, Pasco, WA (US)

(73) Assignee: Garrett Bosch, Yakima, WA (US)

( * ) Notice: Subject to any disclaimer, the term of this patent is extended or adjusted under 35 U.S.C. 154(b) by 188 days.

(21) Appl. No.: 11/292,367

(22) Filed: Dec. 2, 2005

(65) Prior Publication Data
US 2007/0125359 A1    Jun. 7, 2007

(51) Int. Cl.
*F23D 14/62*    (2006.01)
(52) U.S. Cl. ............... 89/11; 434/226; 431/356; 431/354; 431/18; 116/214; 114/15
(58) Field of Classification Search .......... 89/1.1; 434/226; 431/356, 354, 18; 116/214; 114/15
See application file for complete search history.

(56) References Cited

U.S. PATENT DOCUMENTS

| | | | | |
|---|---|---|---|---|
| 2,369,568 A | * | 2/1945 | Herbline | 126/59.5 |
| 4,764,660 A | * | 8/1988 | Swiatosz | 392/397 |
| 4,871,115 A | * | 10/1989 | Hessey | 239/136 |
| 5,320,536 A | * | 6/1994 | Rogers et al. | 434/226 |
| 5,374,191 A | * | 12/1994 | Herman et al. | 434/226 |
| 5,661,985 A | * | 9/1997 | Heng | 62/448 |
| 2006/0199130 A1 | * | 9/2006 | Findley | 431/350 |

OTHER PUBLICATIONS http://www.eta-is-opacity.com/tech2.htm Click on "trailer" to see prior art smoke generator.
http://www.carlkoontzassociates.com See picture of Smoke Machine Generator.

* cited by examiner

*Primary Examiner*—J. Woodrow Eldred

(57) ABSTRACT

An improved system and operating method for a smoke generator machine and control room to be enclosed into a single trailer for the training of personnel in the art of visible smoke opacity compliance monitoring of industrial smoke discharge from smoke stacks by distinguishing the variations of smoke opacity emission based on the requirements set forth by the U.S. Environmental Protection Agency EPA said smoke generator is principally used for production of white and black smoke for simulating smoke discharge from industrial smoke stacks by heating various fuels to the flash point in burn boxes to create white or black smoke and venting said smoke through a duct system to a smoke stack by creating a artificial draft by a speed control fan.

15 Claims, 28 Drawing Sheets

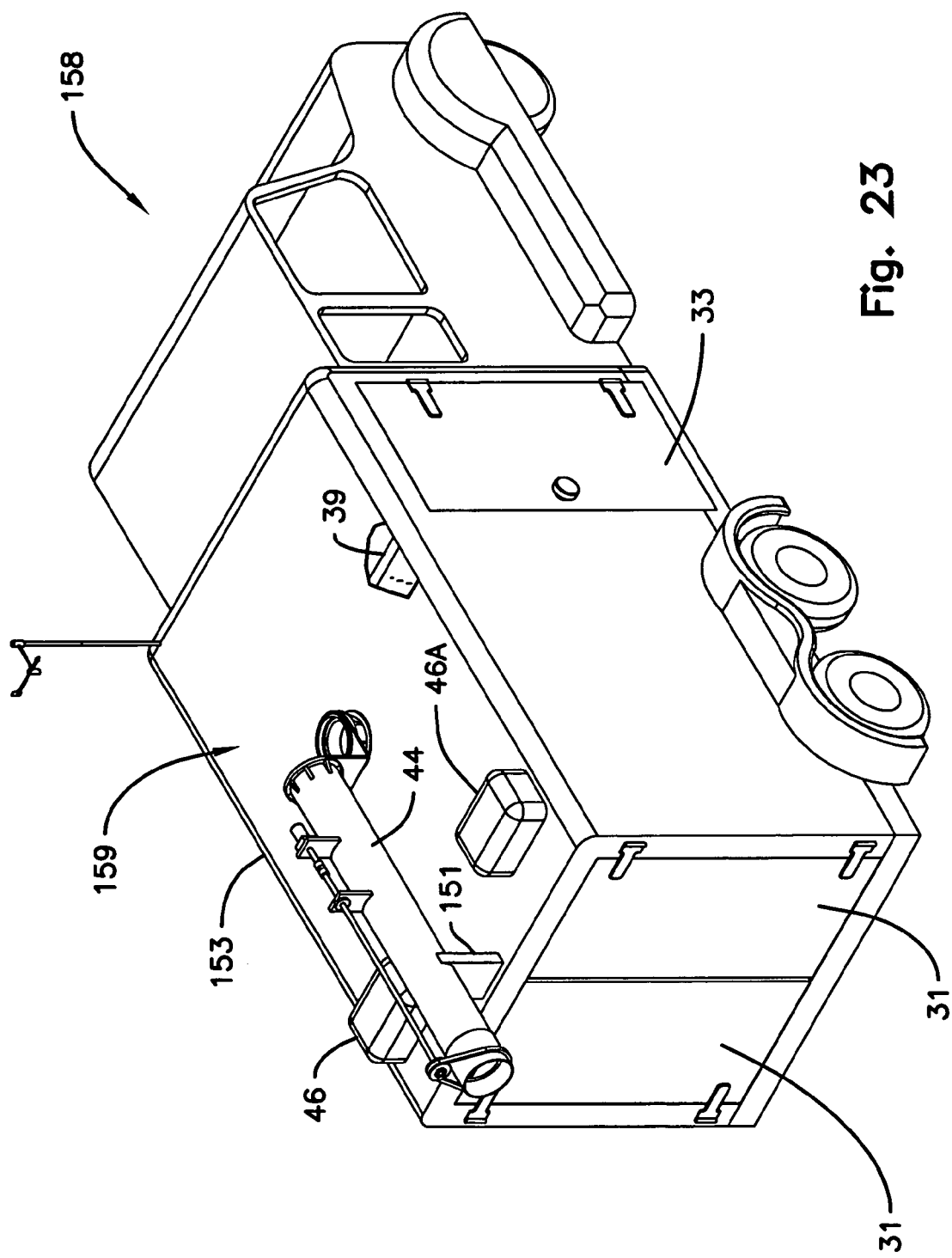

SMOKE GENERATOR MACHINE

FIELD OF INVENTION

The present invention relates, in general, to an improved system, and operating method, for smoke generators used in training of industry and government inspection personnel throughout the United States to be certified, and re-certified yearly in the determination of the opacity emission from smoke stacks. Said personnel are to perform the work based on the United States Environmental Protection Agency (EPA) requirements for compliance monitoring for smoke stack opacity. Our improved invention is related, in particular, to the production of white and black smoke which is used to simulate industrial emission from smoke stacks in use in real time, for the study by, and training of inspection personnel in the visual art of defining smoke opacity.

BACKGROUND AND DESCRIPTION OF THE PRIOR ART

Smoke generators have been used to train personnel as observers of visible emissions in the opacity of smoke generated from smoke stacks produced by industrial nations since the early 1950's, which smoke generators have had little or no improvement to their basic design. However, during the 1960's an improved version of the smoke generator was manufactured to eliminate the use of gasoline engines to make white smoke. Since that time the design configuration of the smoke generator has not been changed to any appreciable degree. A patent search revealed there was, on no account, a patent granted by the U.S. Patent Office for a smoke generator as described in this prior art discussion.

The Prior Art cited below is made of record and is not relied upon in this application as being of interest as follows; it may be said that the prior art cited below teach-away by using smoke to obscure the vision or to hide equipment and personnel in a field of battle, where, our invention teach personnel as observers of visible emission in the opacity of smoke generators as per CFR 40Part 60, Appendix A, Method 9.

- U.S. Pat. No. 5,661,985 Date of September, 1997 By Heng, Ping-Fa
- U.S. Pat. No. 5,374,191 Date of December, 1994 By Herman et al.
- U.S. Pat. No. 5,320,536 Date of June, 1994 By Rogers et al.
- U.S. Pat. No. 4,871,115 Date of October, 1989 By Hessey, B Russell
- U.S. Pat. No. 4,764,660 Date of August, 1988 By Swiatosz, Edmund
- U.S. Pat. No. 2,369,568 Date of February, 1945 By Herbline}

Presently prior art smoke generator systems (1) use a dedicated pull van (3) to transport the smoke generating system (3) on a two-wheeled trailer (8) to various locations to provide a mobile means of bringing the training environment to personnel in the U.S.A., including industrial nations around the world. This means of transportation requires that the electronics set-up time, and the calibration of instruments be repeated at each new location taking excessive time and a great deal of effort.

FIG. 1, shows top isometric view of the prior art smoke generator system (1) comprising an open trailer (2) carrying the mechanical components necessary to generate white and black smoke (6), a photocell assembly (26) to measure the smoke (6) opacity with electric power cables (24) and (25) connecting to a pull van (3) control room (5) showing the operator (9) at the controls who changes and records the opacity of the smoke (6) during the training of personnel.

FIG. 2, shows an enlarged isometric view of the trailer and its components for generating black and white smoke comprising a two-wheeled trailer (8), a white smoke burn box (10), a black smoke burn box (11), an upstream ducting (12) arrangement to the centrifugal blower (15), a down stream ducting (13) to the centrifugal blower (15), a smoke stack (7), a fuel storage tank (17), a storage box (18), and electric generator (19), and photocell assembly (26).

FIG. 2A, is an enlarged sectional view showing a photocell assembly (26) protruding through said stack (7) with a filter (16). Said filter (16) is used to calibrate said photocell assembly (26) against the opacity differences of the smoke (6) generated during the training session.

The prior art method used to generate white smoke exiting the smoke stack (7) caused the smoke to pulsate rather than providing a smooth transitional flow of smoke, which created difficulties during calibration of the smoke opacity. These difficulties arise with the pulsating characteristics of the present centrifugal blower (15), the said pulsating effect causes difficulties in calibrating the smoke opacity.

The prior art centrifugal blower (15) is inefficient in that it requires a high horse power motor, which is costly to operate.

The photocell assembly (26) shown in FIG. 2A is slotted pipe with the photocell positioned at the far end of the pipe and the receiver positioned at the opposite far end of said pipe. The pipe runs across the smoke stack (7) diameter creating turbulence and a non-uniform flow of smoke (6) across the smoke stack (7) diameter. Changing the filters requires the smoke stack (7) be lowered 90 degrees at the hinge pivot to the horizontal position, and a wand is then inserted into a slot of the photocell assembly (26) to replace the filter (16) for calibration. This prior art process is cumbersome and time consuming, including the operating personnel having to work within a soot filled smoke stack (7).

Our patent search for a smoke generator system (1) dates from the early 1950's showing that, to date, a patent has never been applied for, nor has a patent been applied for in the design improvement of said smoke generator system (1).

The above prior art discussion is based on personal experience with the actual operation of the prior art smoke generator systems (1), and the publications which are provided herewith in a Information Disclosure Statement (IDS) in accordance with 37 CFR 1.97.

OBJECT AND ADVANTAGES

Accordingly, several objects and advantages of our smoke generator invention are:

(a) An advantage of our new invention is to integrate both the smoke generating components room (32) and the control room (36) into a single enclosed trailer (30) as compared to the dedicated arrangement of the pull-van trailers used in the prior art smoke generator system (1).

(b) A further advantage, by combining the smoke generator component room (32) and the control room (36) into a single enclosed trailer (30) eliminates the need for the electronics set-up time, calibration of instruments, and the reconnection of power cables, since this work was previously done at the site, as compared to the prior art smoke generator system (1) where this work is repeated at each new location.

(c) A further advantage is the improved design of the white smoke burn box (50) which has been designed to provide a uniform and uninterrupted flow of white smoke (112) to the stack (44) by distributing diesel fuel (98) over a helical wire coil (104) for even burning, and providing air aspiration holes (109) to provide improved and more efficient means of burning fuel.

(d) Another advantage is the design of the black smoke burn box (51) by adding at least two baffles to further arrest the flames needed to obtain an unclean burn thus creating an uninterrupted flow of black smoke (129) to said stack (44).

(e) A further advantage is the turning veins (135) in the plenum box (52) used to minimize the flow of smoke turbulence through a 90° turn to vent up the stack (44). In addition, louvers (132) were added to the side of the plenum box (52) to adjust for ambient weather conditions, to control static combustion in the white burn box (50) and black smoke burn box (51), and to synchronize the flow of smoke (35) with the speed control fan (54).

(f) A further advantage is the replaced prior art blower (15) with a speed control fan (54) to attain enhanced flow control of smoke venting outwardly through stack (44) thereby improving the accuracy of the opacity readings.

(g) To improve the smoke distribution and decrease turbulence across said stack (44) through a plurality of parallel laminar flow tubes (147) positioned above said speed control fan (54).

(h) A further advantage is the improved access to photocell assembly (43) to change-out of filter (28). Said photocell assembly (43) is positioned in the component room (32) within easy access at arm's reach to change out the filter (28) as compared to prior art whereby the photocell assembly (26) is positioned high above in the stack (7) requiring said stack (7) to be lowered by pivoting said stack (7) 90° at hinge (14) to rest onto cradle (151) to access to the photocell assembly (26) to change out the filter (16).

(i) A further advantage is the design of said photocell assembly (43) as shown in FIG. 5A whereby said photocell assembly (43) protrudes outwardly on each side of said lower stack (85) providing a non-obstructive flow of smoke (35) thru said lower stack (85), as compared to the prior art whereby said photocell assembly (26) protrudes through said stack (7) as shown in FIG. 2A creating an obstruction of the flow of smoke (6) by having to bypass said photocell assembly (26), thus disrupting the flow of smoke (6) and the smoke (6) opacity being viewed by said personnel (38).

(j) A further advantage is the addition of the background screen (57) with a checkered surface ~118~ highlighted on the surface facing the smoke (35) to enhance the visual contrast of the smoke (35) opacity during training sessions whereby white smoke is enhanced across the black checkered surface ~118~ and black smoke is enhanced across the white checkered surface ~118~.

(k) Another advantage is the use of a battery system (155) to provide direct DC power to all electric components of said smoke generator (30) to include the photocell assembly (43), fan (89), strip chart (45), computer (71), and solenoid valves (70) to comply with EPA requirements to maintain power to all DC voltage components for at least thirty minutes in the event of the failure of the electrical generator (68). Whereas, the electric generator (19) is used exclusively to power the prior art smoke generator system (1) as well as all DC powered electrical components without a battery back-up system, which does not meet the EPA requirements to maintain power to all DC voltage components for at least thirty minutes in the event of failure of the electrical generator (19). Upon failure of said prior art electric generator (19) the operation of the prior art smoke generator system (1) becomes inoperative thus requiring the cancellation of the training session.

SUMMARY OF THE INVENTION

FIG. 3 discloses our invention of a smoke generator (30) machine used to produce white and black smoke (35) for training of personnel (38) for visually monitor and identifying the smoke opacity of industrial smoke stacks based on EPA compliance requirements.

The present invention discloses a smoke generator (30) that is controlled by an operator (40), who manually adjusts the needle fuel valves (42) and (64) to change the amount of fuel flowing to the white smoke burn box (50) or the black smoke burn box (51) to vary the opacity of the smoke being produced.

The opacity of the smoke (35) generated is vented through the smoke stack (44), whereby the opacity of the smoke is measured by the use of a photocell assembly (43). The measured smoke opacity data is recorded on a strip chart (45) and compared and graded against the observed visual readings by the personnel (35) being tested and graded accordingly.

The smoke generator (30) machine comprising a white smoke burn box (50), a black smoke burn box (51), a smoke plenum box (52), a laminar gas flow housing (53), a speed control fan (54), a gravity-fed white smoke fuel system (55), a gravity-fed black smoke fuel system (56), a smoke background screen (57), electric motor belt drive system (59), a wind directional indicator (61), and an emergency battery powered (62) backup system.

BRIEF DESCRIPTION OF THE DRAWINGS

The drawings form part of this specification showing features and advantages of the present invention which will become more readily appreciated as the invention becomes better understood by reference to the following detailed description of the preferred embodiment of this invention, when taken in conjunction with the accompanying drawings, wherein:

FIG. 23 is a alternative embodiment of the smoke generator (159) built within a enclosed motor vehicle (158) shown in a transportation mode with the smoke stack (44) lowered 90° resting in the cradle (151) with rear doors (31) and side door (33) closed.

Figure 1:
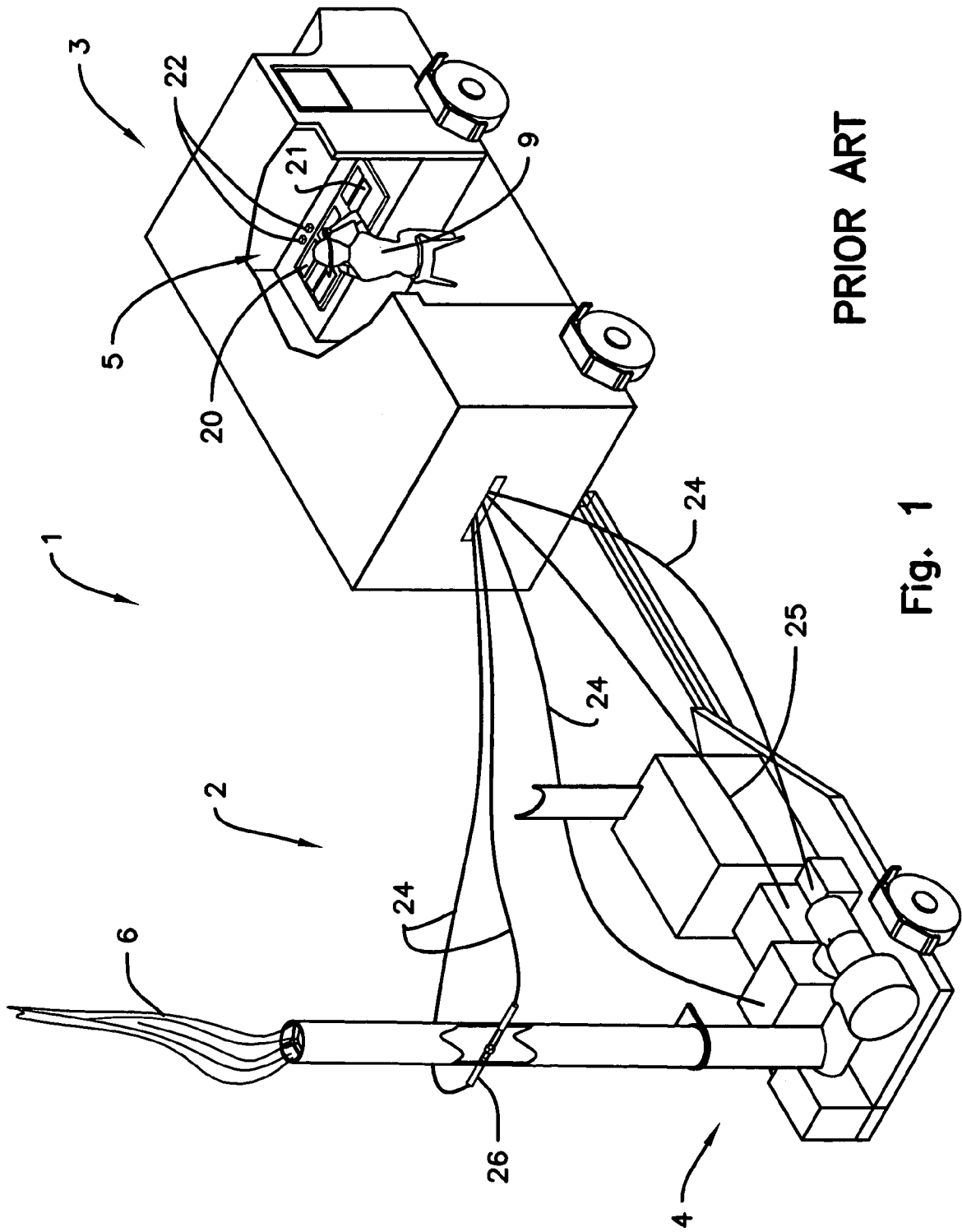
FIG. 1 illustrates the prior art smoke generator comprising the components of the system with the stack (6) in the vertical position.
Figures 2, 2A:
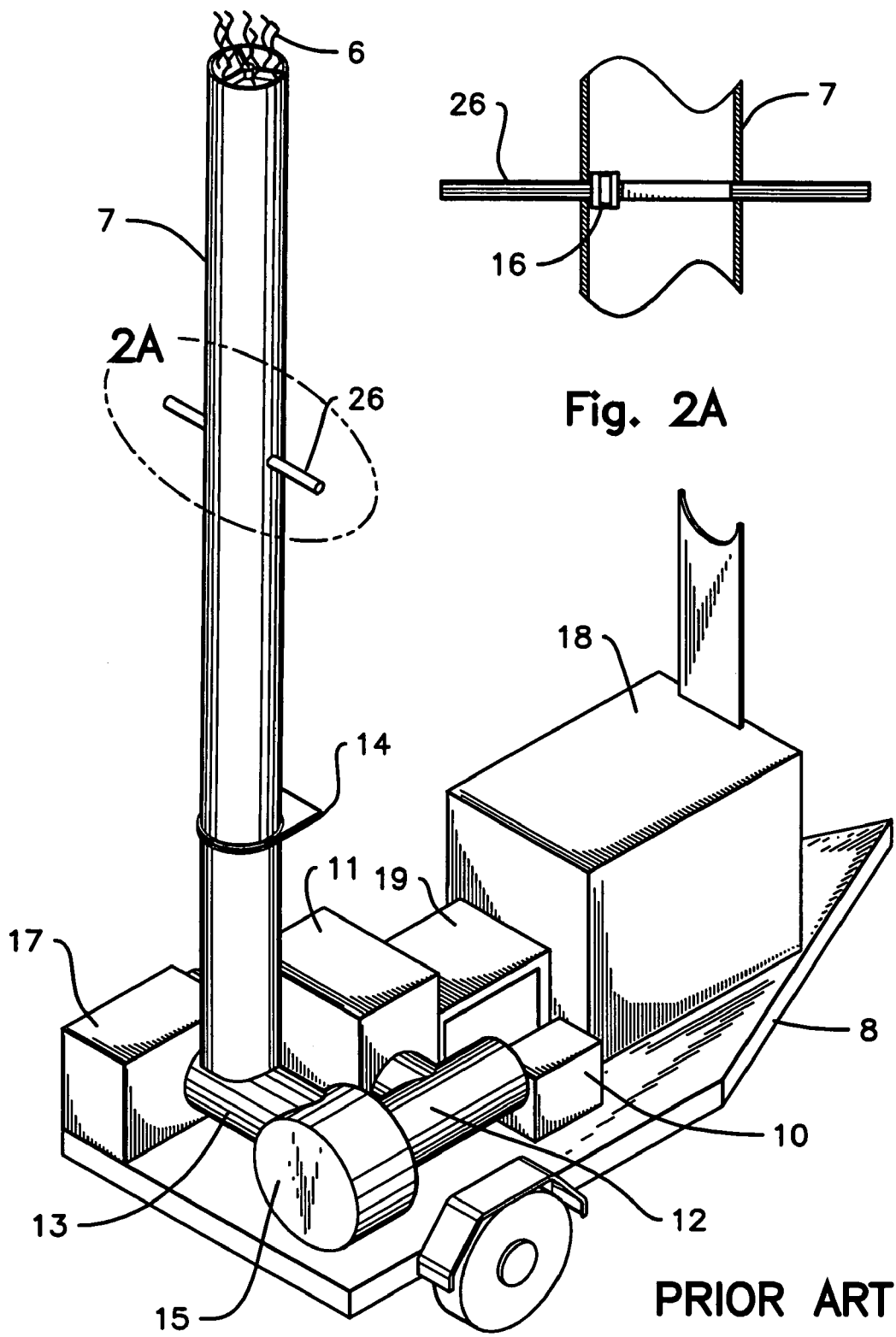
FIG. 2 illustrates the prior art smoke generator showing an enlarged view of the components of the system.
FIG. 2A illustrates a sectional view showing the prior art installation of the photocell assembly (26) protruding through the stack (7).

| Reference Numerals Used in Figures | | | |
|---|---|---|---|
| 1. | Prior art smoke generator system | 2. | Open trailer |
| 3. | Prior art pull van | 4. | Control components |
| 5. | Control components | 6. | Smoke |
| 7. | Smoke stack | 8. | Two-wheeled trailer |
| 9. | Operator | 10. | White smoke burn box |
| 11. | Black smoke burn box | 12. | Upstream ducting |
| 13. | Downstream ducting | 14. | Hinge |
| 15. | Centrifugal blower | 16. | Filter |
| 17. | Fuel storage tank | 18. | Storage box |
| 19. | Electric generator | 20. | Electrical switches |
| 21. | Strip chart recorder | 22. | Solenoid valves |
| 23. | Filter box | 24. | Electric cables |
| 25. | Main electric cable | 26. | Photocell assembly |
| 27 & 27A | Photocell tube arm | 28. | Photocell filter |
| 29. | Control console | 30. | Smoke generator |
| 31. | Door | 32. | Component room |
| 33. | Door | 34. | Butane gas supply bottle |
| 35. | Smoke | 36. | Control room |
| 37. | Trailer cab | 38. | Personnel |
| 39. | Wall | 40. | Operator |
| 41. | Trailer bed | 42. | Needle fuel valves |
| 43. | Photocell assembly | 44. | Smoke stack |
| 45. | Strip chart | 46. & 46A | Fuel tanks |
| 47. | Extended fuel lines | 48. | Inlet manifold |
| 49. | Pipes | 50. | White smoke burn box |
| 51. | Black smoke burn box | 52. | Smoke plenum box |
| 53. | Laminar flow housing | 54. | Speed control fan assembly |
| 55. | Gravity-fed white smoke fuel system | 56. | Gravity-fed black smoke fuel system |
| 57. | Background screen | 58. | Stack ring assembly |
| 59. | Electric motor belt drive system | 60. | Stack elbow |
| 61. | Wind directional indicator | 62. | Battery power |
| 63. | Laminar flow tube assembly | 64. | Needle valve |
| 65. | Duct elbow | 66. | Elbow duct |
| 67. | Fan housing | 68. | Electric generator |
| 69. | Windows | 70. | Solenoid valve |

-continued

| Reference Numerals Used in Figures | | | |
|---|---|---|---|
| 71. | Computer | 72. | Drive shaft |
| 73. | Electric motor | 74. | Pulley disc |
| 75. | Mounting brackets | 76. | Coupling |
| 77. | Belt | 78. | Boot seal |
| 79. | Top centering web | 80. | Rod |
| 81. | Lower centering web | 82. | Attachment rod |
| 83. | Stack ring | 84. | Centering shaft |
| 85. | Lower stack | 86. | |
| 87. | Orifice | 88. | Electric speed control motor |
| 89. | Fan | 90. | White smoke generator assembly |
| 91. | Butane inlet pipe | 92. | Butane gas |
| 93. | Extension tube | 94. | Welded |
| 95. | Centering web | 96. | Flame |
| 97. | | 98. | Diesel fuel |
| 99. | Threaded tube cover | 100. | Threaded tube housing |
| 101 | Threaded spool | 102. | |
| 103 | Diesel fuel droplets | 104 | Helical wire coil |
| 105 | Helical strip | 106 | Aspiration holes |
| 107 | | 108 | |
| 109 | Air flow | 110 | Center threaded pipe |
| 111 | Fuel feed tube | 112 | White smoke |
| 113 | | 114 | Photocell light emitter |
| 115 | Butane inlet pipe | 116 | Photocell collector |
| 117 | | ~118~120 | Checkered surface |
| 119 | Black smoke generating system | | |
| 121 | | 122 | Lower centering hole |
| 123 | Photocell light beam | 124 | Burn pot |
| 125 | Baffle | 126 | Centering hole |
| 127 | Toluene fuel feed tube | 128 | Toluene fuel |
| 129 | Black smoke | 130 | Curved |
| 131 | Center line | 132 | Louvers |
| 133 | Turning vanes | 134 | Louver adjustment lever |
| 135 | Turning vanes | 136 | Louvered frame |
| 137 | Motor mounting bracket | 138 | Flow directional path |
| 139 | Belt | 140 | Motor pulley |
| 141 | Belt slot | 142 | Fan mounting bracket |
| 143 | Motor shaft | 144 | Fan blades |
| 145 | Fan pulley | 146 | Fan shaft |
| 147 | Laminar flow tubes | 148 | Converter |
| 149 | Inverter | 150 | Pivot hinge |
| 151 | Cradle | 152 | Hinge pin |
| 153 | Cab | 154 | Electrical system |
| 155 | Battery system | 156 | Battery |
| 157 | Battery charger | 158 | Enclosed motor vehicle |
| 159 | Smoke Generator | 160 | Hitch |

DETAILED DESCRIPTION OF THE PREFERRED EMBODIMENT(S)

Figure 3:
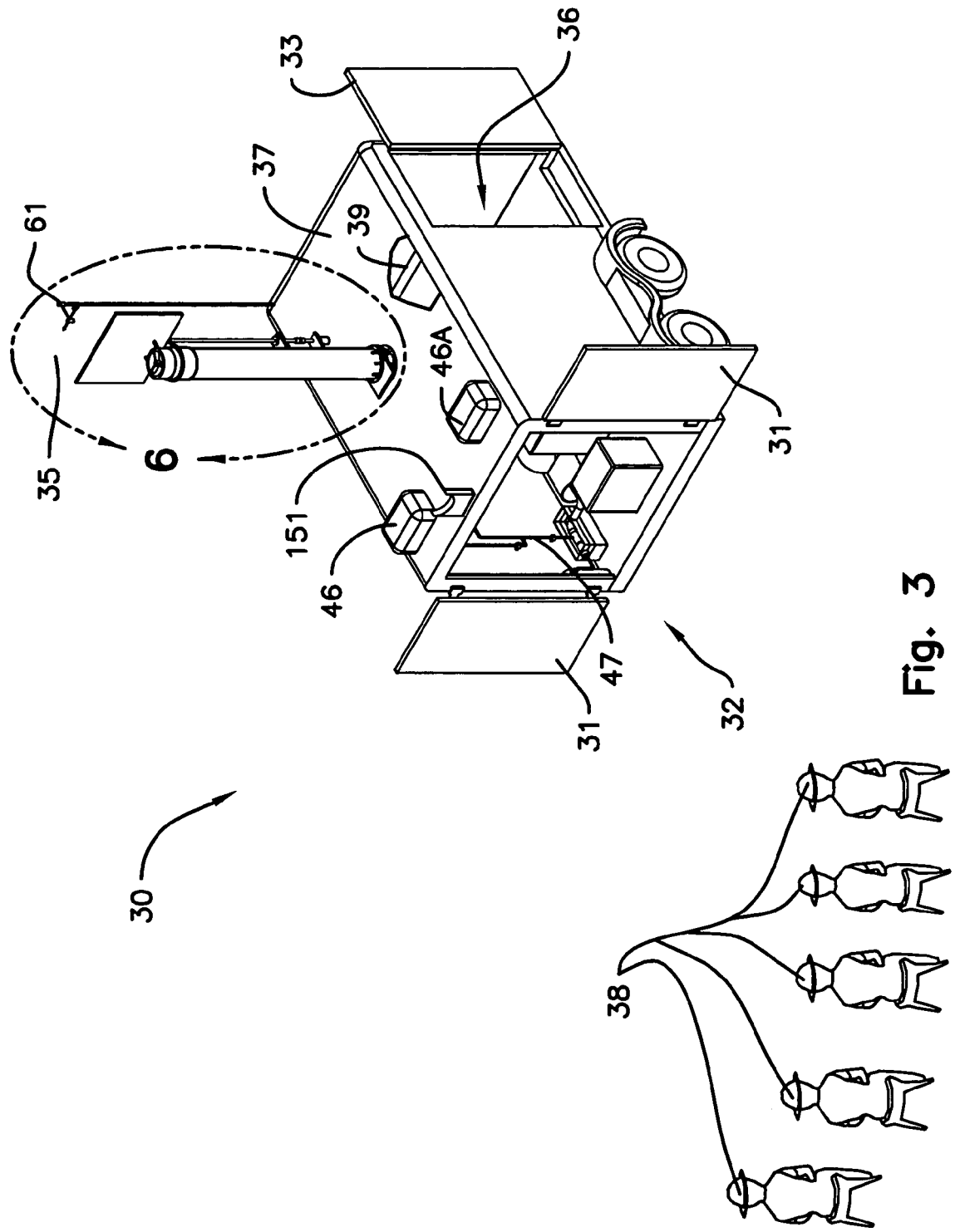
FIG. 3 is the preferred embodiment of the smoke generator illustrating its use as a training tool in the visual determination of smoke opacity.

FIG. 3 is the preferred embodiment illustrating a prospective rear view of the smoke generator (30) with rear doors (31) shown in the open position exposing a portion of the smoke generating components (32), and the side door (33) is shown open to the entrance to the control room (36) separated from the smoke generating component room (32) by a wall (39), with fuel tank (46) and (46A) positioned on top of the trailer cab (37) to provide a gravity-fed head pressure for fuel distribution of the piping system (47), and personnel (38) being tested to visually determine the smoke (35) opacity seated at least fifty yards from the smoke generator (30) during the training session. A wind directional indicator (61) positioned on top of said trailer cab (37) to determine the direction of the prevailing wind.

Figure 4:
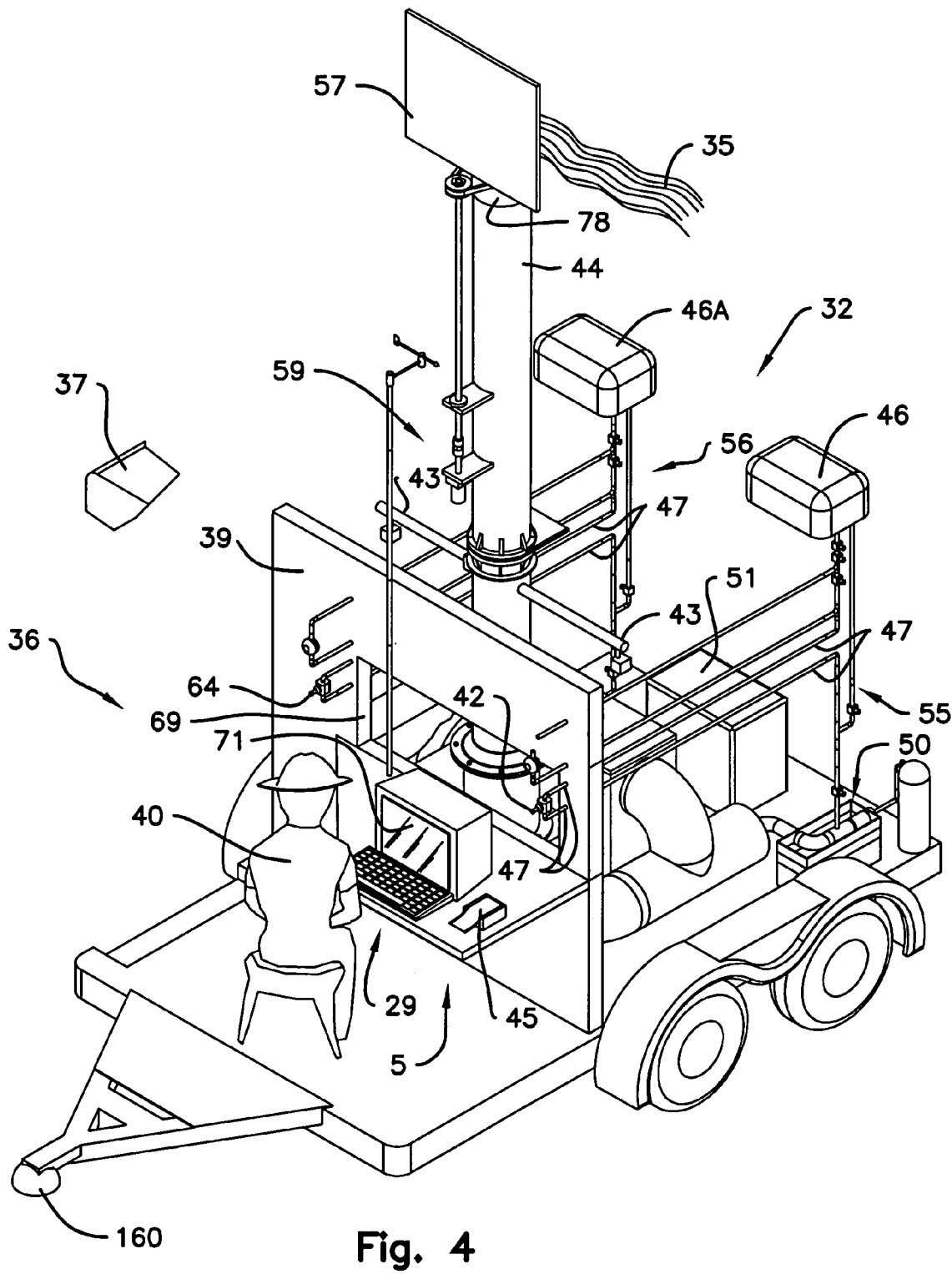
FIG. 4 is a detailed top frontal isometric view of the preferred embodiment of my smoke generator invention, with the trailer cover (37) removed, exposing the internal system components.

FIG. 4 is a front top isometric view of the preferred embodiment with the trailer cover (37) removed to illustrate the control components (5) of the system showing the control room (36), an operator (40), fuel tanks 46 and 46A, and extended fuel lines (47) to the gravity-fed white smoke system (55) and gravity-fed black smoke system (56) are shown penetrating the wall (39) to place needle valves (42) and (64) into the control room (36) for the operator (40) to have access to manual adjustment of the needle valves (42) and (64) to control fuel burning rates during training session.

A control console (29), a computer (71) to monitor and control the sequence of events during training, a strip chart (45) to record smoke opacity during the training events, a separation wall (39) to isolate the control room (36) from the component room (32), a window (69) used by the operator (40) to visual inspect said component room (32), a photocell assembly (43) to measure smoke opacity, an electric motor belt drive system (59) to rotate the stack elbow (60) in the direction of the prevailing wind to assure a smooth flow of the smoke (35) flowing past the background screen (57), and a boot seal (78) to seal the joint between said stack elbow (60) and smoke stack (44).

Figure 5:
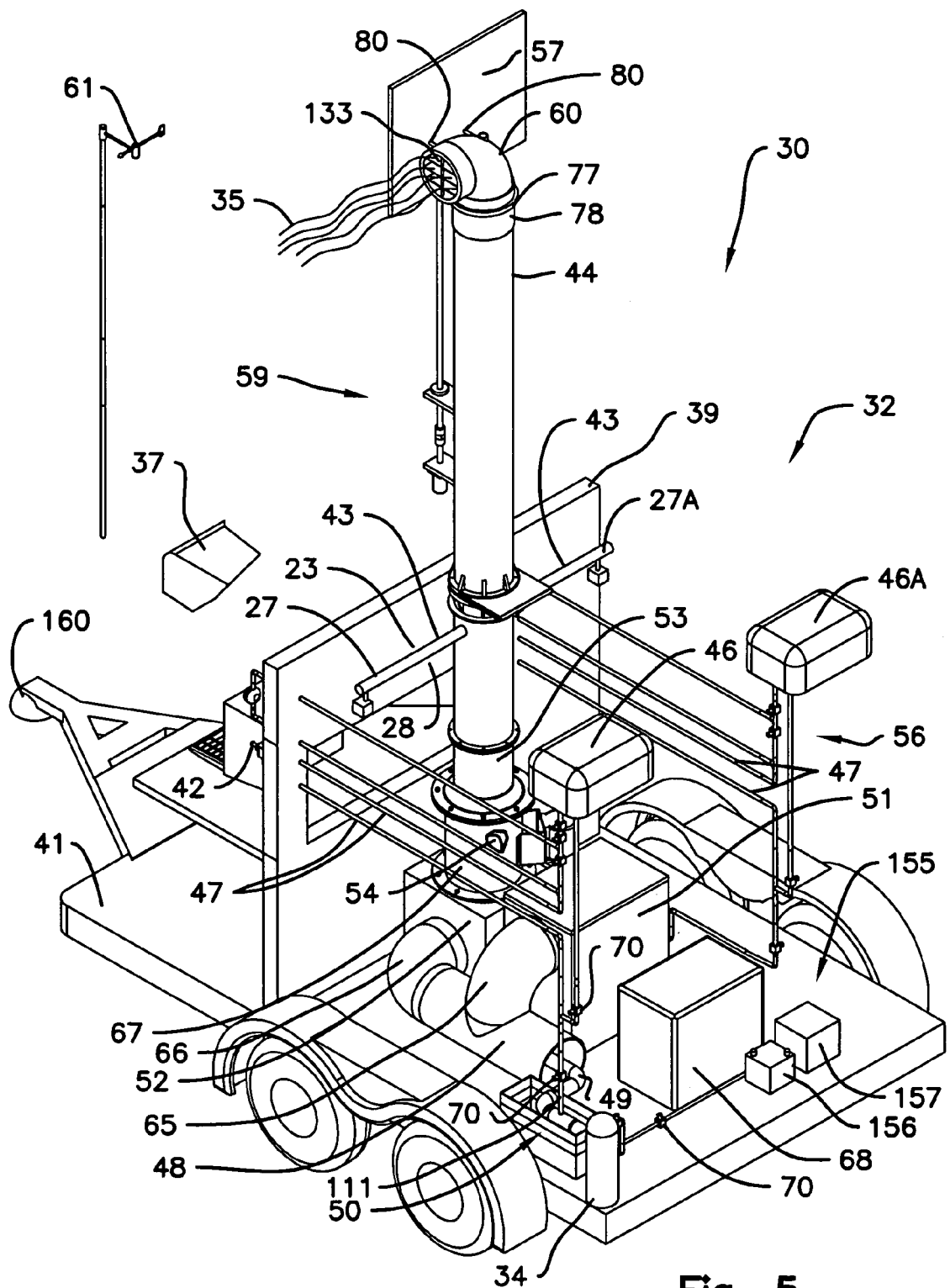
FIG. 5 is a detailed top rear isometric view of the embodiment of the smoke generator invention, with the trailer cover (37) removed, exposing the internal system components.

FIG. 5 is a rear top isometric view of the preferred embodiment with the trailer cover (37) removed to illustrate the apparatus in the component room (32) comprising a trailer bed (41), a butane gas supply bottle (34) to heat elements, contained in a white smoke burn box (50) ducting white smoke generated through a series of pipes (49) to the inlet manifold (48) opening when generating white smoke (35). A duct elbow (65) affixed to the inlet manifold (48) at one end and to the black smoke burn box (51) at the other end, a gasoline operated electric generator (68), a battery system (155) comprising a battery (156) to power the electronics of the smoke generator (30), and a battery charger (157) to charge said battery (156) with power provided by the electric generator (68).

Smoke (35) generated by the white smoke burn box (50), or by the black smoke burn box (51), flows through the elbow duct (66) into the smoke plenum box (52) as a result of a negative pressure created by a speed control fan assembly (54) contained within the fan housing (67). The said smoke (35) then flows through the laminar flow box (53), past the photocell assembly (43), and is vented through the smoke stack (44) to the atmosphere.

The photocell filter (28) is positioned in a box (23) welded to the photocell tube arm (27) and (27A) to change the filter (28) during calibration testing.

A boot seal (78) connects the stack elbow (60) to the smoke stack (44), preventing smoke (35) from leaking, and allowing the rotation of the stack elbow (60) during wind direction adjustments.

A background screen (57) is attached to the stack elbow (60) by means of two or more rods (80) welded (94) at the ends of said rods (80).

Figure 5A:
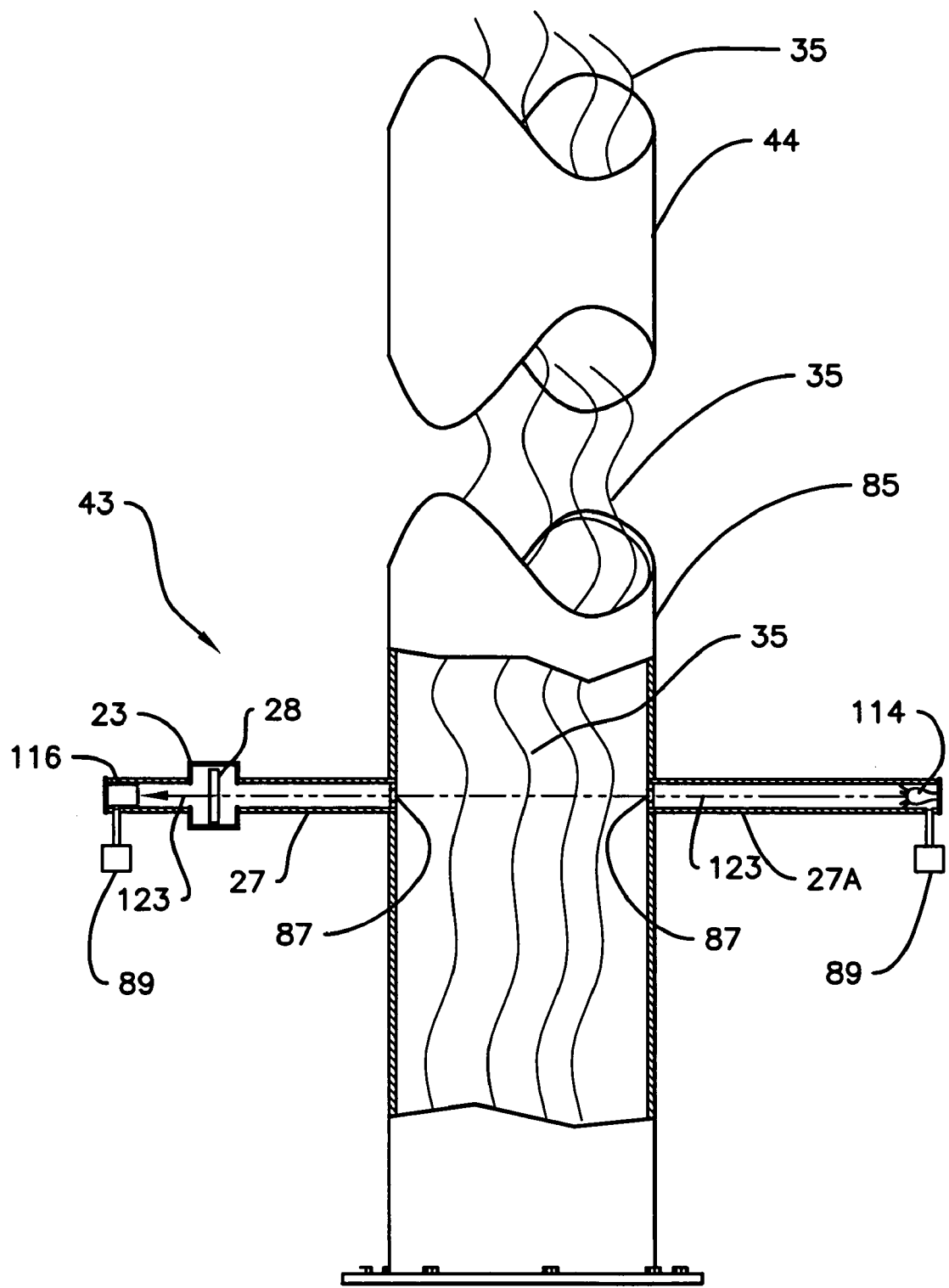
FIG. 5A is a orthogonal sectional view showing the preferred embodiment installation of the photocell assembly (43) illustrating the photocell tube arm (27) connection to one side of the lower stack (85) and a second tube arm (27A) connection to the lower stack (85) directly opposite to said first tube arm (27) connection to maintain close tolerance concentric alignment between said photocell orifices (87) for the photocell light beam (123) to pass through smoke (35) to the photocell collector (116). Fan (89) is used to clear smoke (35) from said photocell assembly (43).

FIG. 5A is a sectional view showing the preferred embodiment photocell assembly (43) illustrating the photocell tube arm (27) connected to one side of the lower stack (85) and tube arm (27A) connected to the opposite side of said lower stack (85) to provide a non-obstructed flow path to the smoke (35) to flow through the lower stack (85) and smoke stack (44) as well as maintaining a close concentric tolerance alignment between said photocell tube arm (27), (27A), and orifices (87).

The arrangement of said photocell tube arms (27), (27A) and said orifices (87) provide a straight line path from the photocell light beam (123) to pass through the smoke (35) flowing through the lower stack (85) to the photocell collector (116) positioned directly opposite to the photocell light emitter (114) to obtain precise opacity readings at the strip chart (45). A filter box (23) welded to photocell tube arm (27) houses the photocell filter (28) which is used to calibrate the photocell. A blowers (89) to purge tubes (27) and (27A).

Figure 6:
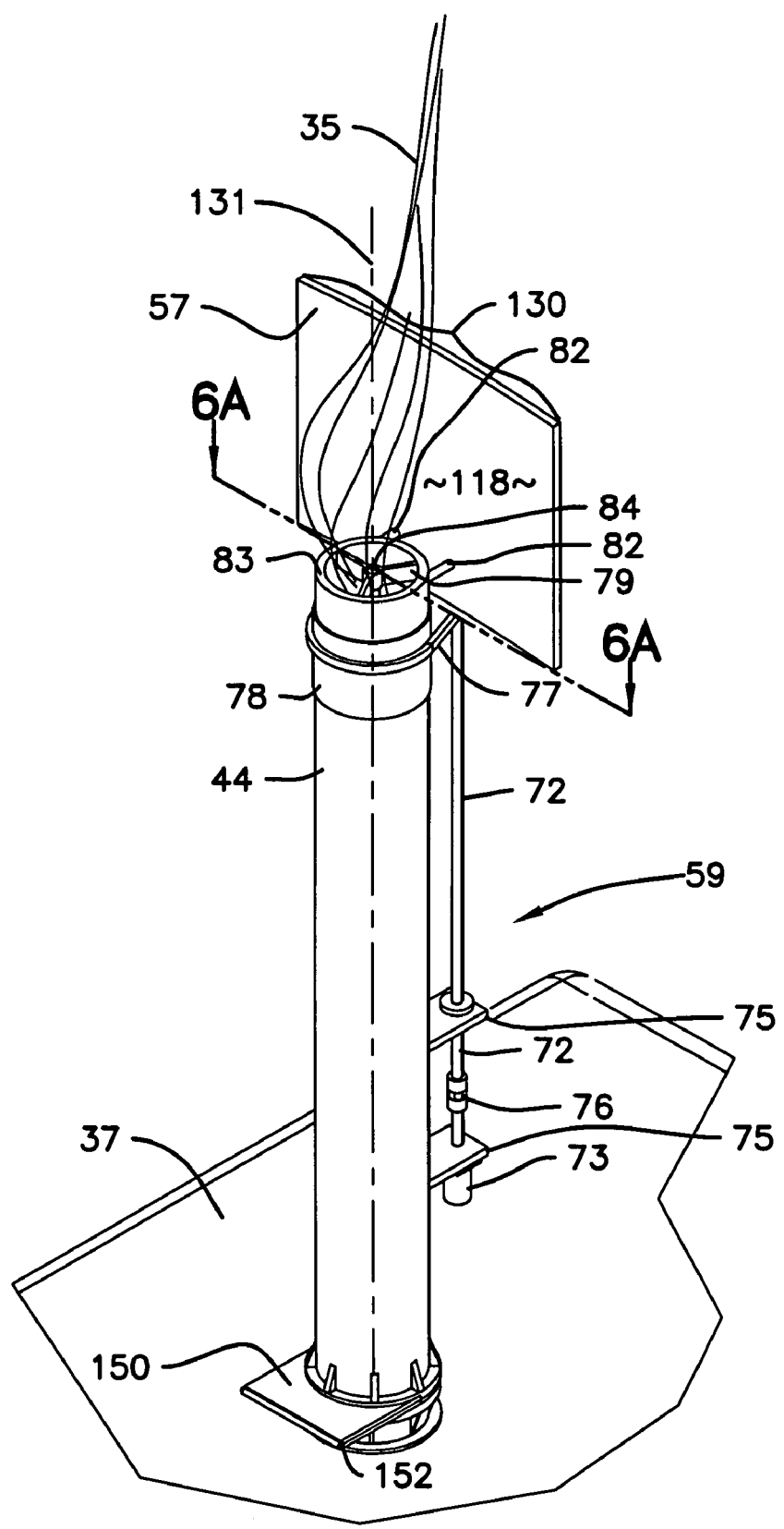
FIG. 6 is an enlarged top isometric view of the smoke stack (44) showing an electric motor belt drive system (59) connected to the stack ring (83) by attachment rods (82) boot seal (78) and belt (77).

FIG. 6 is an enlarged view of the smoke stack (44) exposing the electric motor belt drive system (59) comprising an electric motor (73), a drive shaft (72) to transmit electric motor (73) torque to rotate stack ring (83), a coupling (76) to compensate for drive shaft (72) misalignment, brackets (75) to guide said drive shaft (72), and a pulley disc (74) to mount belt (77).

Said belt (77) transmits torque to rotate stack ring (83), through a boot seal (78) providing a sealing means between said stack ring (83) and said smoke stack (44).

Said stack ring (83) is used during calm weather when the prevailing winds are not present, thus permitting the smoke (35) to rise vertically upward to be silhouetted against the background screen (57) to enhance the visual definition by personnel (38) of said smoke (35) opacity during the training session.

The background screen (57) is pivotally adjustable within 360° radial positions about the center-line (131) of said smoke stack (44) with said electric motor belt drive system (59), and said background screen (57). Said background screen (57) is substantially curved (130) to enhance the visibility of smoke (35) opacity.

A wind directional indicator (61) is used as a indicium means to establish the prevailing wind direction to position the stack elbow (60) and background screen (57) in the direction of said prevailing wind.

Figure 6A:
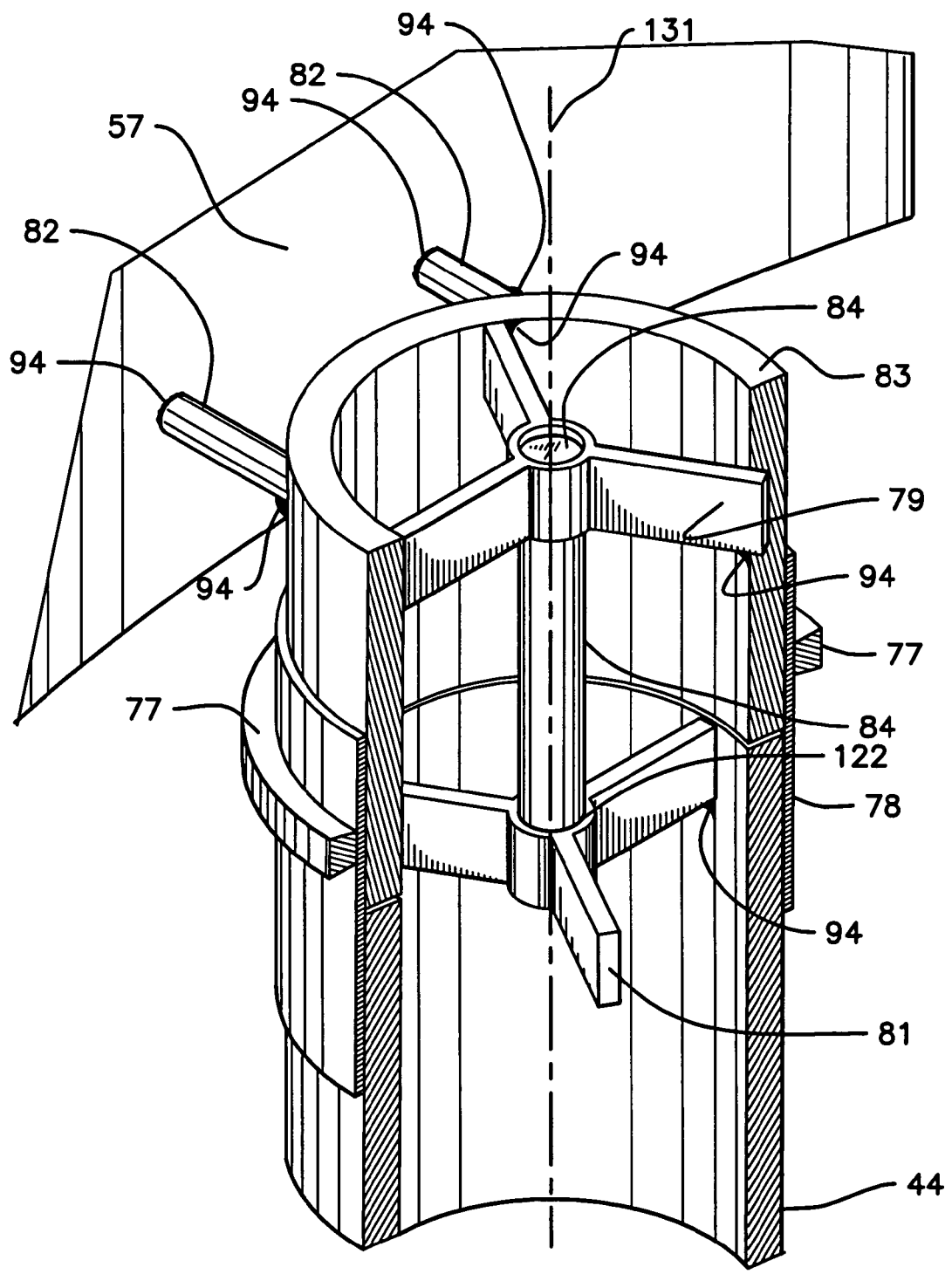
FIG. 6A is a isometric sectional view taken from FIG. 6 showing a means of attaching the background screen (57) to the stack ring (83) with attachment rods (82) and assembly of the stack ring (83) onto the smoke stack (44).

FIG. 6A is a section taken from FIG. 5 showing a isometric view at the top end of the smoke stack (44) with said background screen (57) contiguously attached by welds (94) to the stack ring (83) by at least two rods (82). Said stack ring (83) rests on the top surface of said smoke stack (44) retained by a rubber boot seal (78) and belt (77), and said stack ring (83) centered concentric with center line (131) with centering shaft (84) fitted between center hole (126) and lower centering hole (122).

Figure 6C:
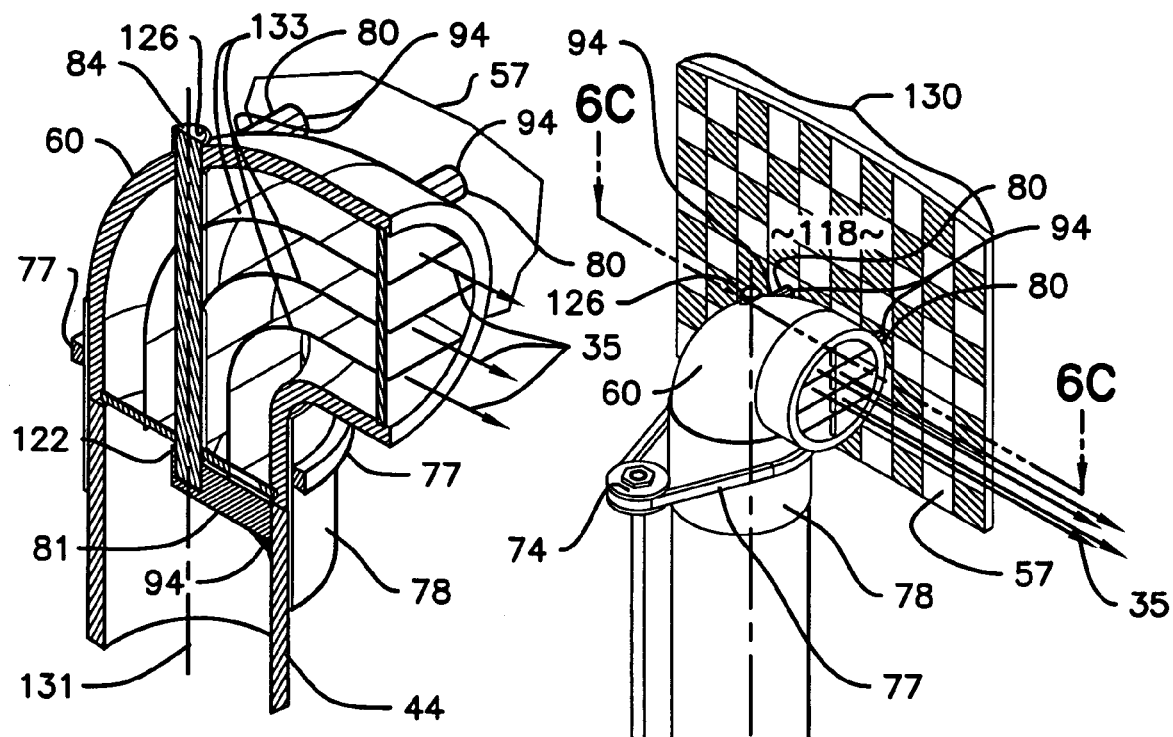
FIG. 6C is a isometric sectional view taken from FIG. 6B showing the turning veins (133) the centering shaft (84) the lower centering web (81) the boot seal (78) and belt (77).
Figure 6B:
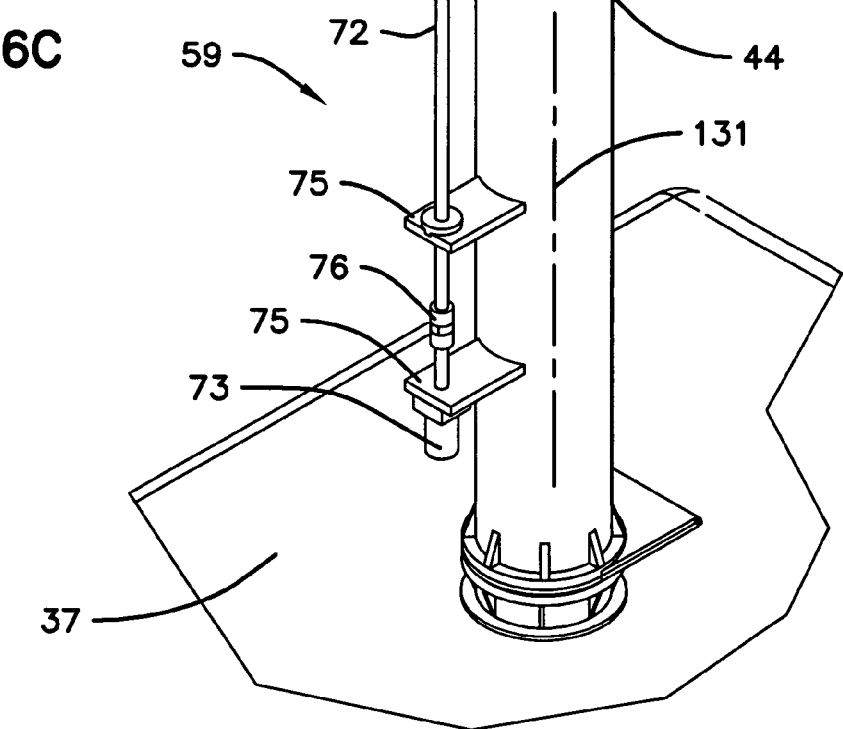
FIG. 6B is a left top frontal isometric view of the smoke stack (44) showing the electric motor belt drive system (59) and background screen (57) with the checkered surface ~118~ on background screen (57).

FIG. 6B is a frontal isometric view of the smoke stack (44) showing the stack elbow (60), electric motor belt drive system (59), and background screen (57) with the checkered surface ~118~, said background screen (57) is contiguously connected to said stack elbow (60) by at least two rods (82) by welds (94) or other means.

Said background screen (57) checkered surface ~118~ includes dark and white squares to enhance the visual contrast of said smoke (35) opacity for personnel (38) evaluation, and is substantially curved (130) to enhance the visibility of said smoke (35) opacity.

Said belt (77) grips over said boot seal (78) onto the bottom flange of said stack elbow (60) creating a high friction force, urging said stack elbow (60) to rotate with torque produced by the electric motor belt drive system (59) thereby rotating said stack elbow (60) 360° to all desired positions about said smoke stack (44) centerline (131).

FIG. 6C is a isometric sectional view of the stack elbow (60) taken from FIG. 6B showing the turning veins (133), a belt (77), a boot seal (78), centering shaft (84), rods (80), welds (94), background screen (57), and smoke stack (44). Said stack elbow (60) rests at the top end of the smoke stack (44) with said background screen (57) contiguously connected to said stack elbow (60) by at least two rods (80) by welds (94), and retained into position by a rubber boot seal (78), belt (77), and positioned concentric with center line (131) with centering shaft (84) fitted between the centering hole (126) and lower centering hole (122).

Said turning veins (133) minimize turbulent flow of said smoke (35) to enhance the visual opacity evaluation by personnel (38).

Figure 7:
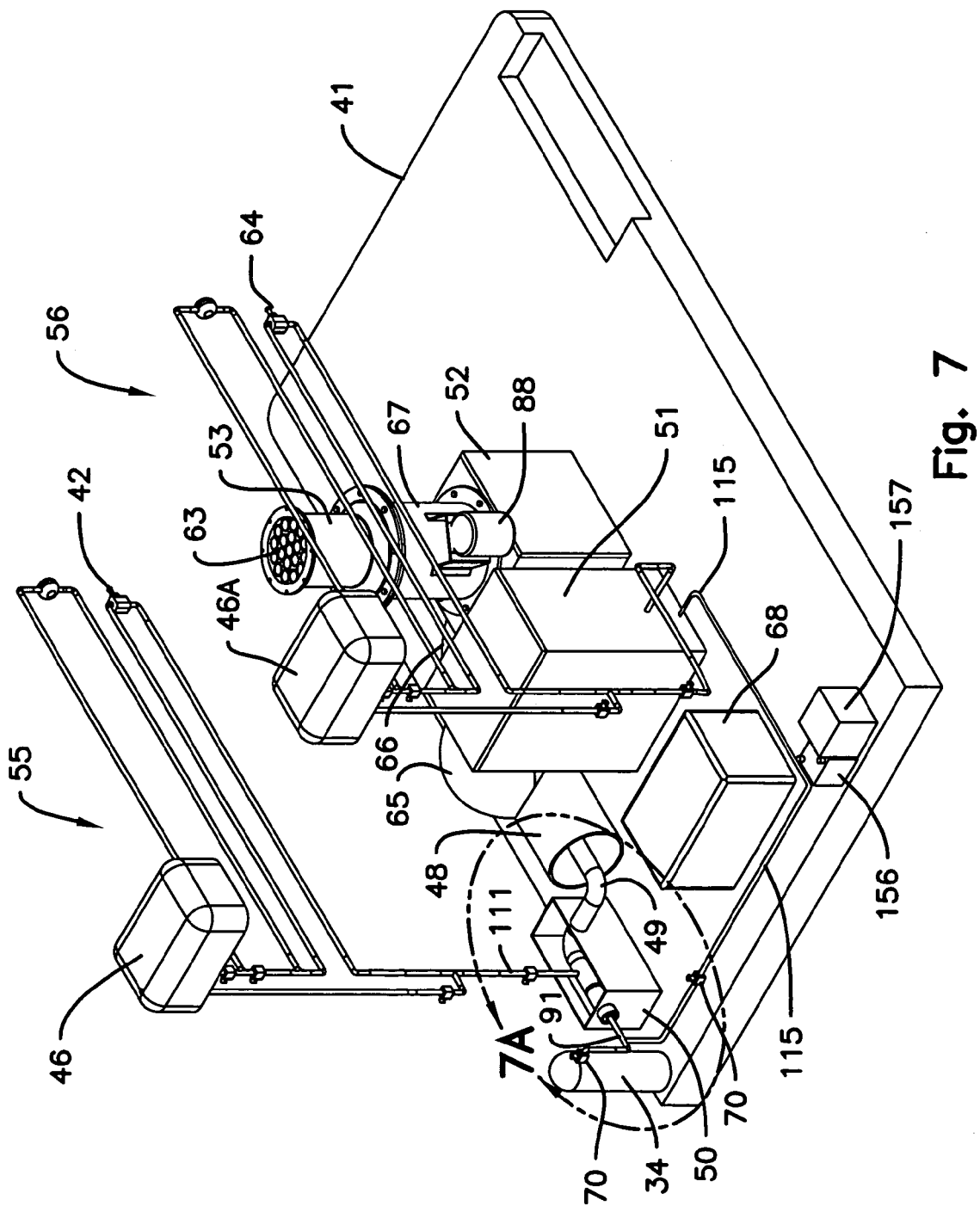
FIG. 7 shows a top isometric view of all components and ducting used to produce and transport the white and black smoke (35) to the stack (44). All other portions of the trailer were removed to isolate and clarify the said view.

FIG. 7 is a top isometric view of the preferred embodiment showing only the components used to produce the white and black smoke (35) and the ducting used to transport the smoke (35) up the stack (44) for clarity purposes, comprising trailer bed (41), a butane gas supply bottle (34), a butane inlet pipe (91), a white smoke burn box (50), a pipe (49), an inlet manifold (48), a duct elbow (65) connected to the black smoke burn box (51), a elbow duct (66), a smoke plenum box (52), a electric speed control motor (88), a extension duct (67), a laminar flow housing (53), laminar flow tube assembly (63), a white smoke fuel system (55), a fuel tank (46), a black smoke fuel system (56), a fuel tank (46A), a needle valve (42), a needle valve (64), and a electric generator (68).

Figure 7A:
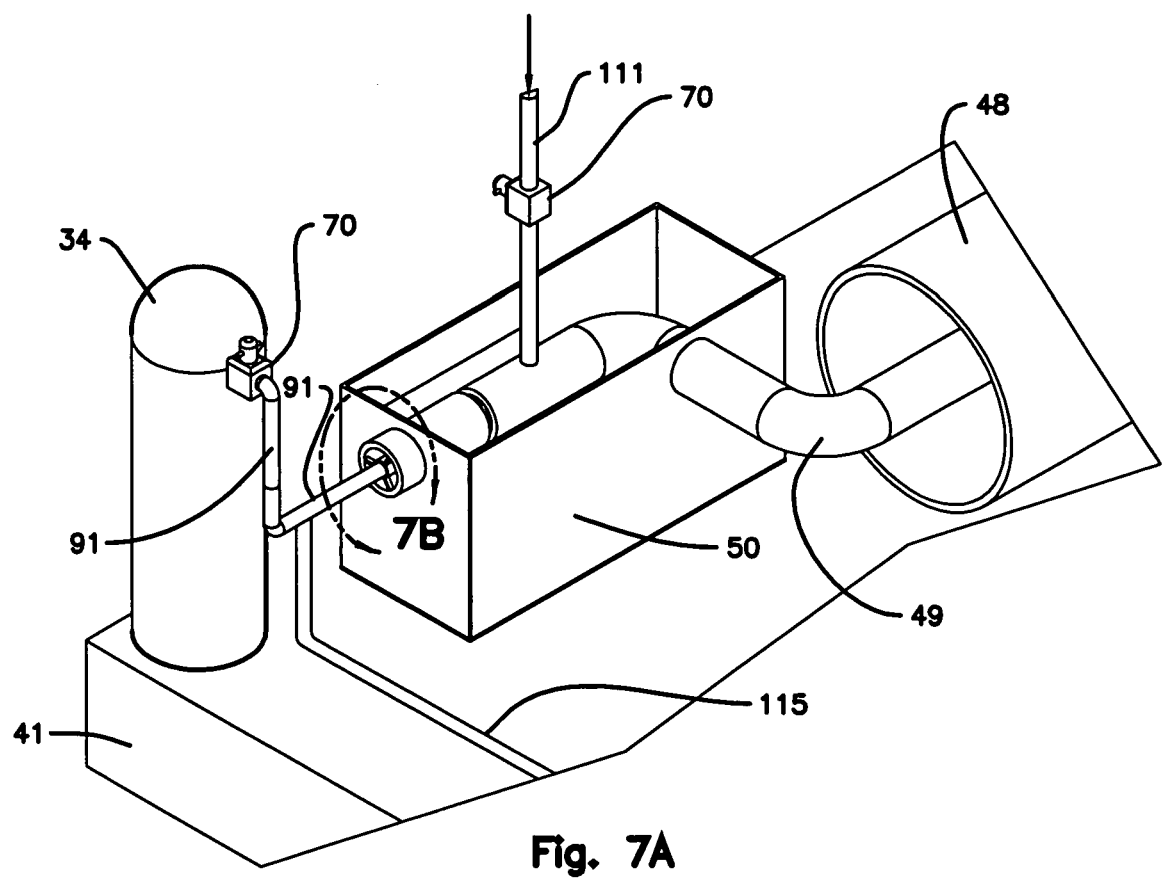
FIG. 7A is a enlarged view of the white smoke burn box (50).

FIG. 7A shows a enlarged view taken from FIG. 7 comprising a butane gas supply bottle (34), a butane inlet pipe (91), a white smoke burn box (50), a pipe (49), and a inlet manifold (48).

Figure 7B:
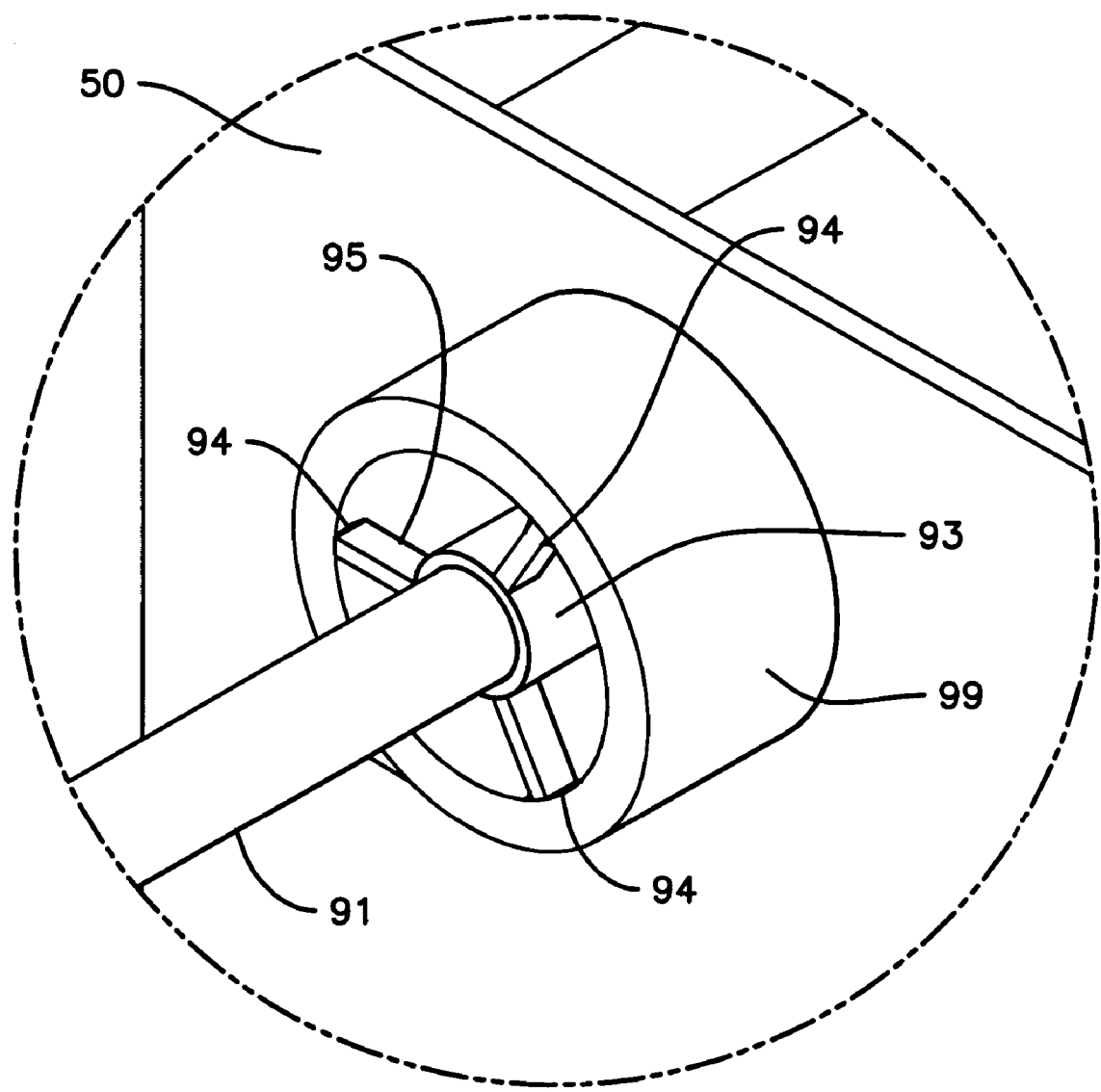
FIG. 7B is a enlarged view showing the weld arrangement of the centering web of the extension tube and the outer threaded tube cover.

FIG. 7B shows a enlarged view taken from FIG. 7A comprising a butane inlet pipe (91), a extension tube (93), and a centering web (95) used to center said extension tube (93) to the threaded tube (99).

Figure 8:
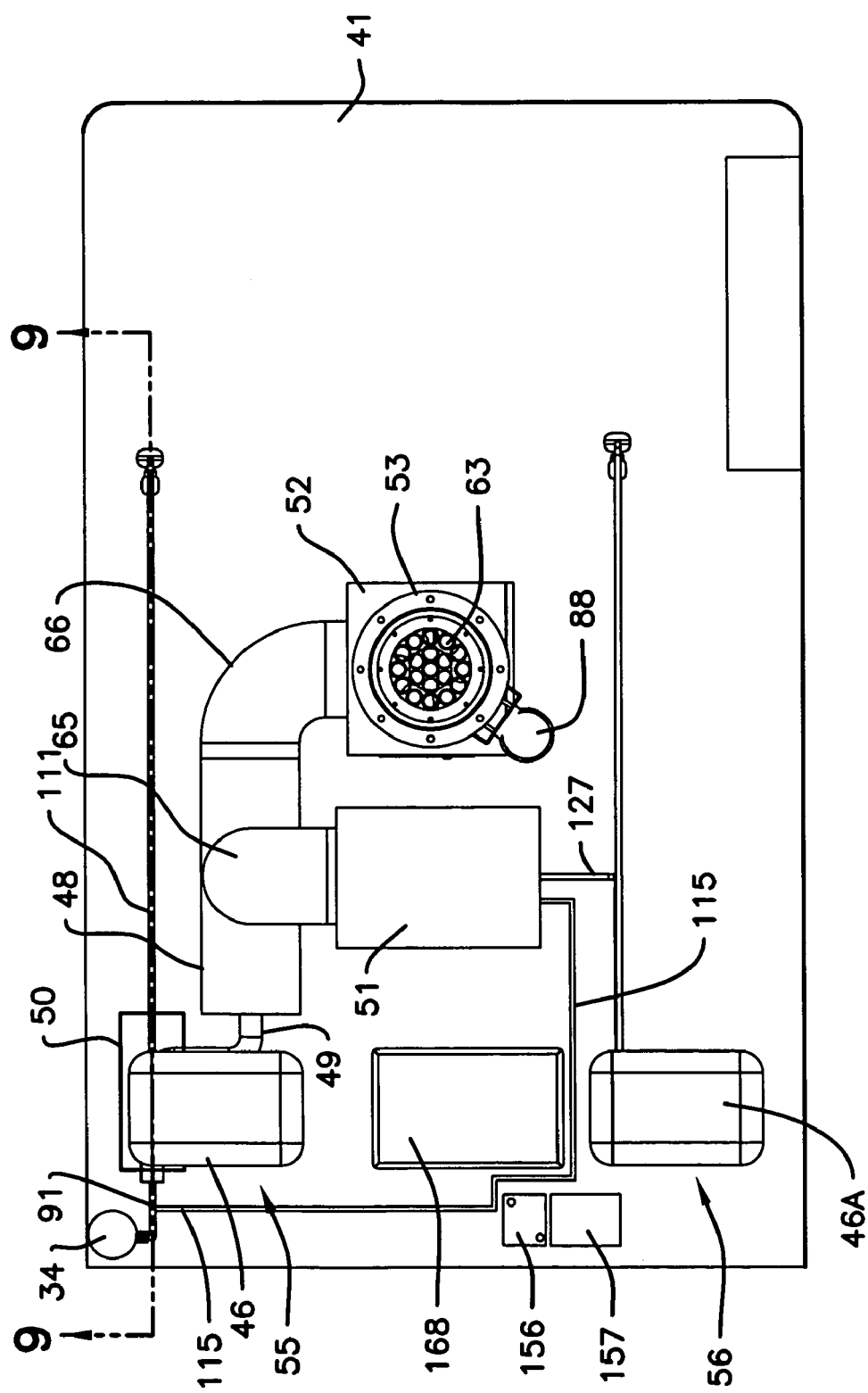
FIG. 8 is a top orthogonal view shown in FIG. 7.

FIG. 8 is a top orthogonal view of FIG. 7 comprising a trailer bed (41), a Butane gas supply bottle (34), a white smoke burn box (50), a pipe (49), a inlet manifold (48), a duct elbow (65), a elbow duct (66), a smoke plenum box (52), a electric speed control motor (88), a laminar flow housing (53), and laminar tube assembly (63).

Figure 9:
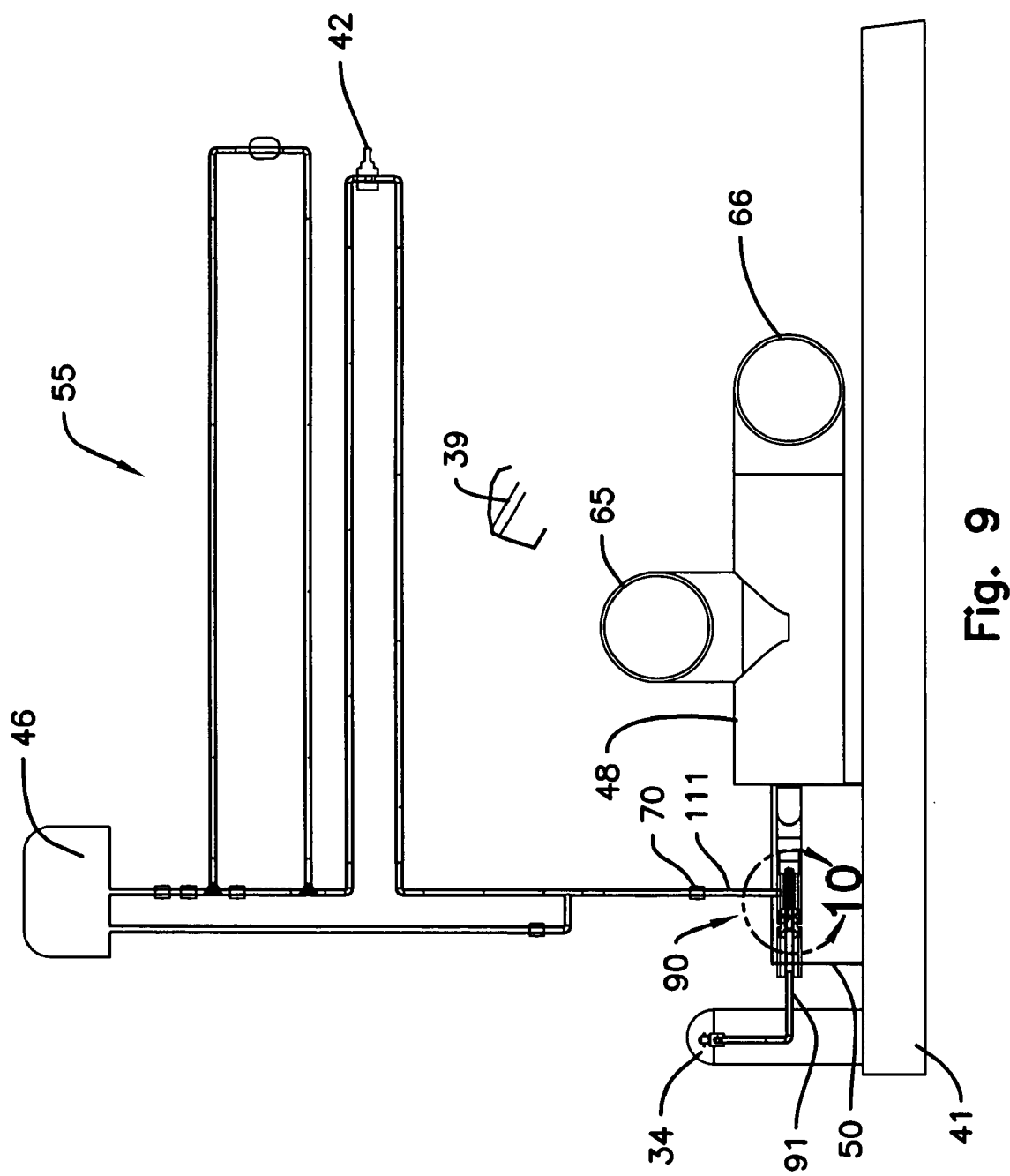
FIG. 9 is a sectional view taken from FIG. 8.

FIG. 9 is a section taken from FIG. 8 showing the basic components used in generating white smoke (112) comprising a white smoke fuel system (55), a fuel tank (46), a white smoke generator assembly (90), a trailer bed (41), a butane gas supply bottle (34), a butane inlet pipe (91), a white smoke burn box (50), a inlet manifold (48), a needle valve (42), a duct elbow (65), a gravity-fed white smoke fuel system (55), and a elbow duct (66).

Figures 10, 10A:
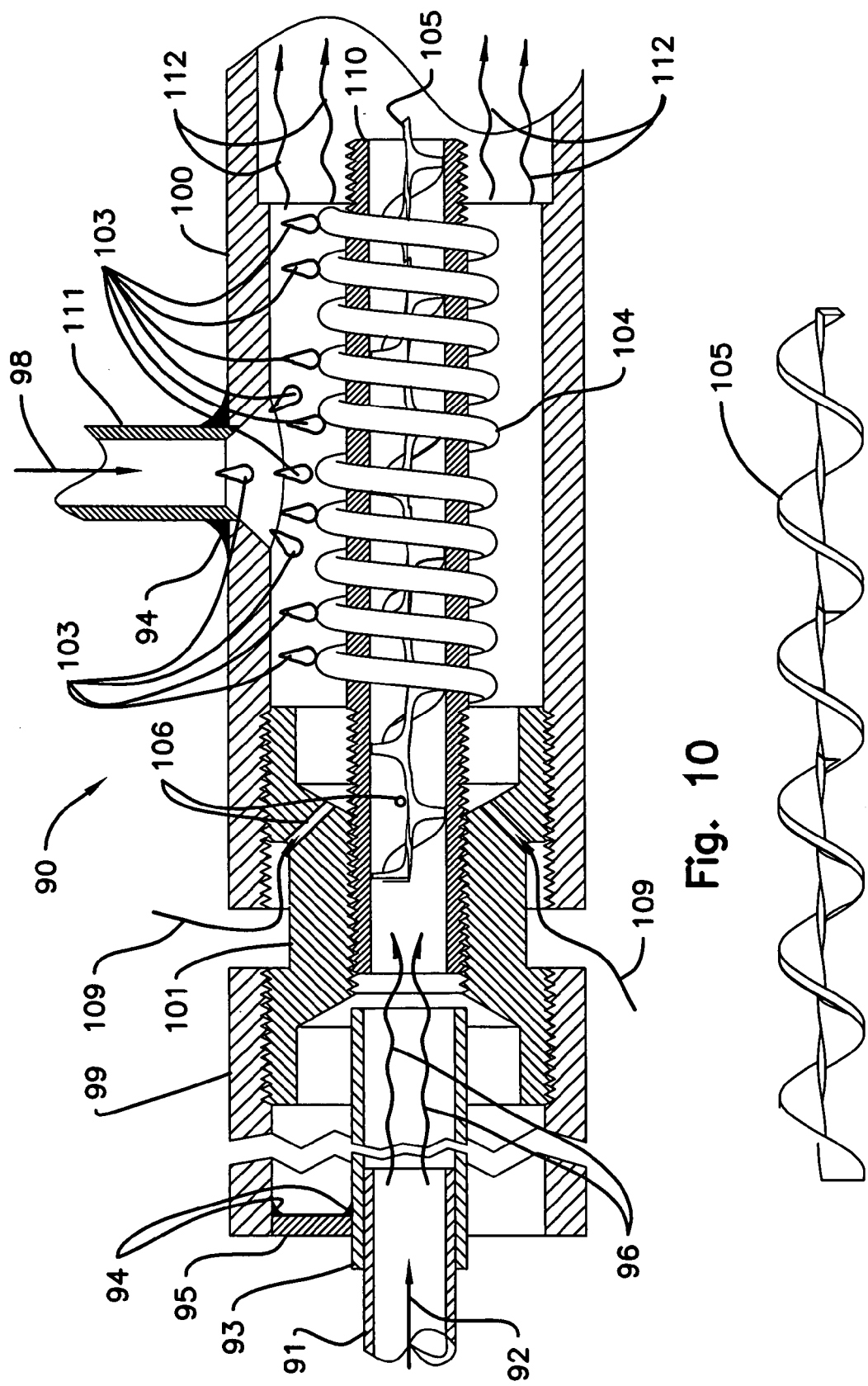
FIG. 10 is a enlarged view taken from FIG. 9 showing a sectional view of the white smoke generator assembly.
FIG. 10A is a detailed view of the helical strip.

FIG. 10 is a enlarged sectional view taken from FIG. 9 showing a white smoke generator assembly (90) comprising a threaded tube cover (99) to attach the threaded spool (101) and center threaded pipe (110), a centering web (95) to center the butane inlet pipe (91), a outer threaded tube housing (100), a fuel feed tube (111), a helical wire coil (104), a helical strip (105), a centering web (95) and a extension tube (93) and a plurality of aspirating holes (106). flow of butane gas (92), a flame (96), a extension tube (93), a centering web (95), White smoke (112) production is initiated by igniting said butane gas (92) to heat the internal components of said white smoke generator assembly (90) to the flash point temperature of said diesel fuel (98), whereby the flash point temperature of the internal components of said white smoke generator assembly (90) is maintained by the continuous flow of the butane gas (92) during the said production of white smoke (112).

Opening said needle valve (42) diesel fuel (98) drips onto the helical coil (104) flashing into white smoke (112). The production of white smoke (112) is maintained by the continuous burning the ignited butane gas (92) and the dripping of diesel fuel (98) onto the helical coil (104).

FIG. 10A is an enlarged view of the helical strip (105).

Figure 11:
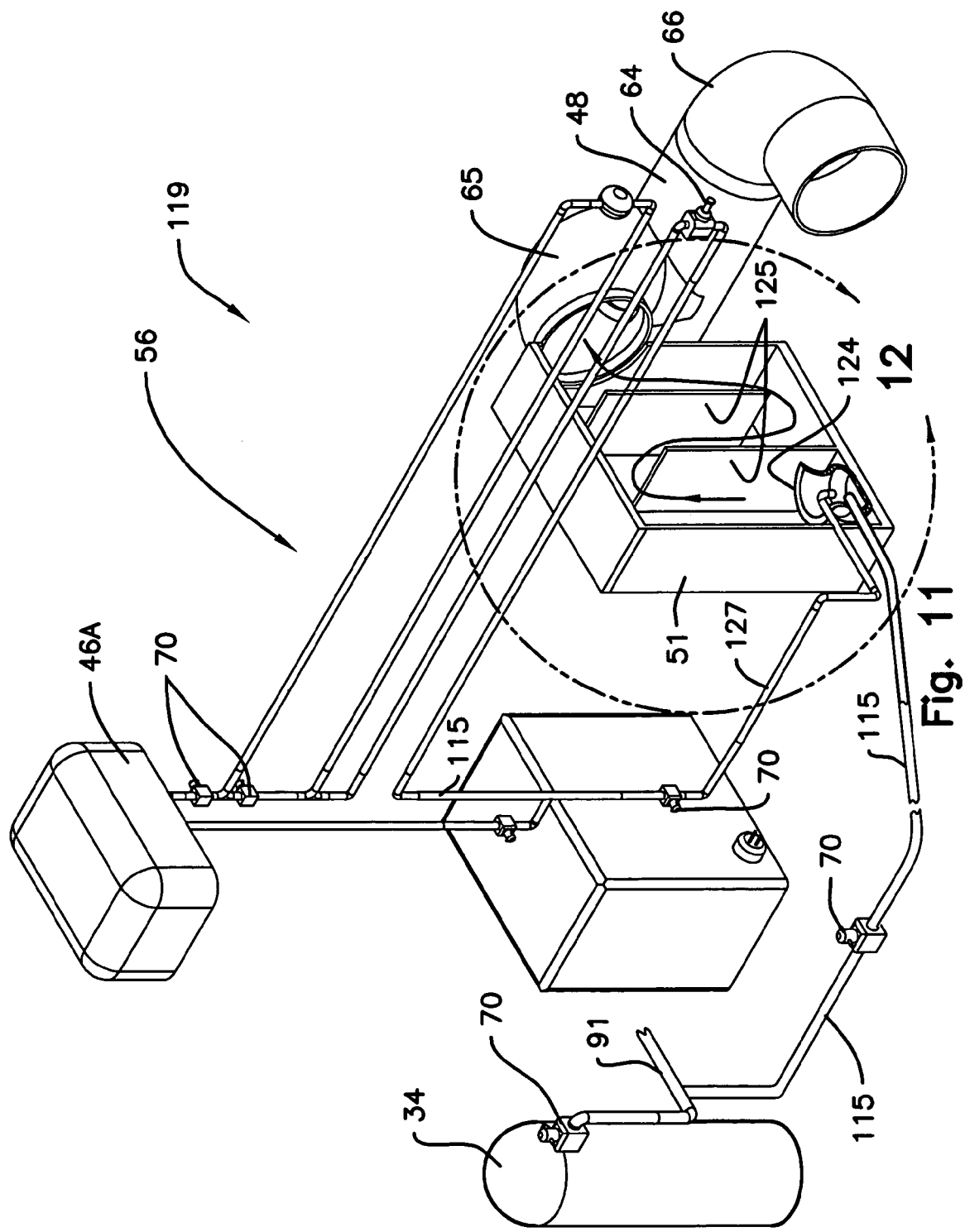
FIG. 11 is a partial sectional isometric view showing the black smoke generating system.

FIG. 11 shows a partial sectional isometric view of the black smoke generating system (119) comprising a gravity-fed black smoke fuel system (56), a sectional view of a black smoke burn box (51), needle valve (64), a duct elbow (65), a inlet manifold (48), a elbow duct (66), a butane gas supply bottle (34), a burn pot (124), a butane inlet pipe (115), two baffles (125), and a toluene fuel feed tube (127).

Figure 12:
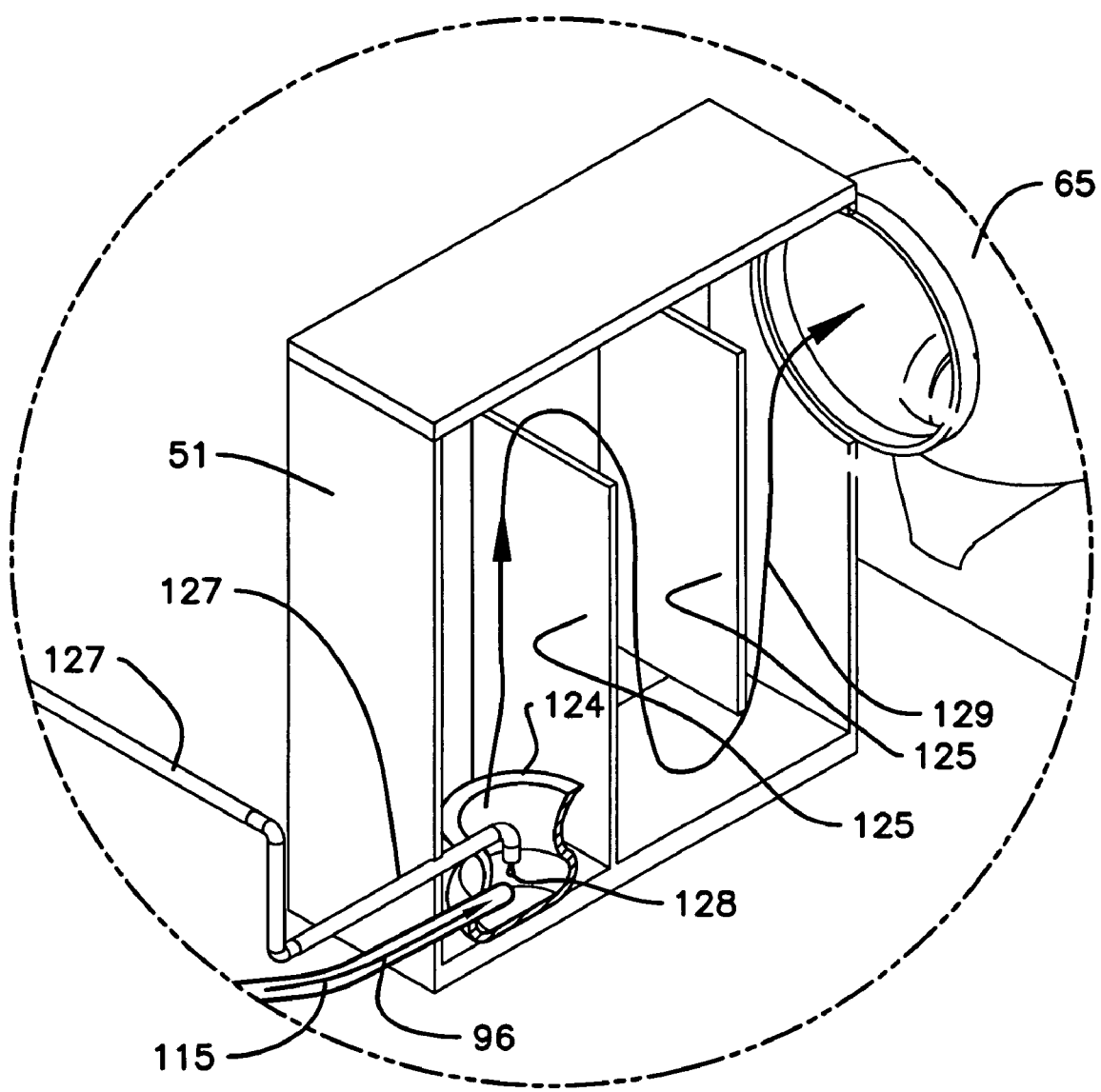
FIG. 12 is a enlarged sectional view of the black smoke box taken from FIG. 11.

FIG. 12 is a enlarged view taken from FIG. 11 comprising the black smoke burn box (51), a burn pot (124), a fuel feed tube (127), a butane inlet pipe (115), toluene fuel (128), two baffles (125), a duct elbow (65), and a leader arrow pointing to the venting direction of the black smoke (129).

Black smoke (129) production is initiated by igniting said toluene fuel (128) with the propane gas igniter. Once ignited, the toluene fuel (128) will maintain its burn to continually produce black smoke (129). Closing needle valve (64) turns off the flow of toluene fuel (128) thereby shutting off production of the black smoke (129).

Figure 13:
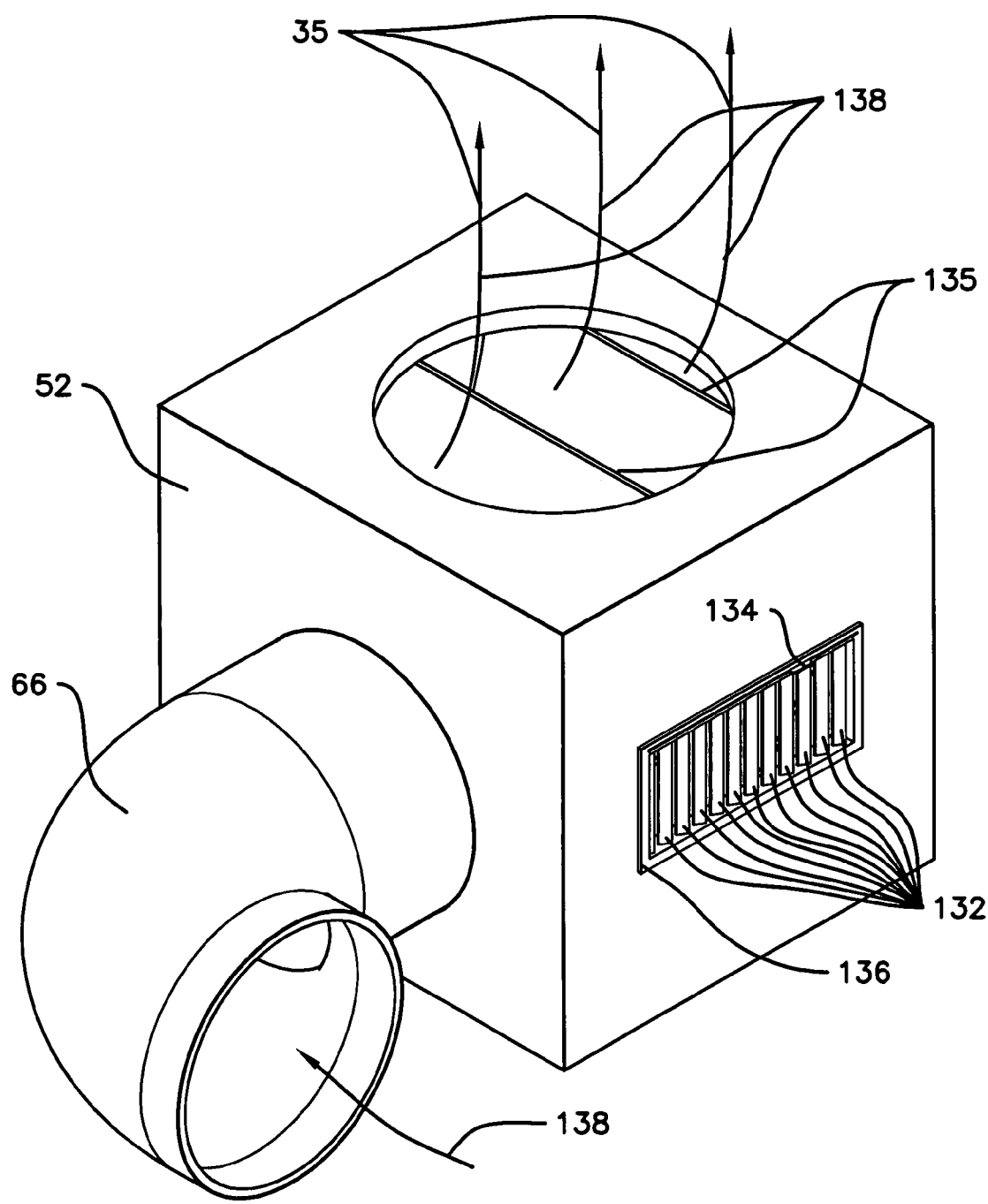
FIG. 13 is a isometric view of the smoke plenum box (52).

FIG. 13 is a isometric view of the smoke plenum box (52), comprising a elbow duct (66), a turning veins (135), louver adjust lever (134), louvers (132), louver frame (136), and smoke (35) flow direction path (138). Said turning veins (135) provide a smooth transition of the flow of smoke (35) around the 90° turn from elbow duct (66) to the laminar flow housing (53).

Figure 14:
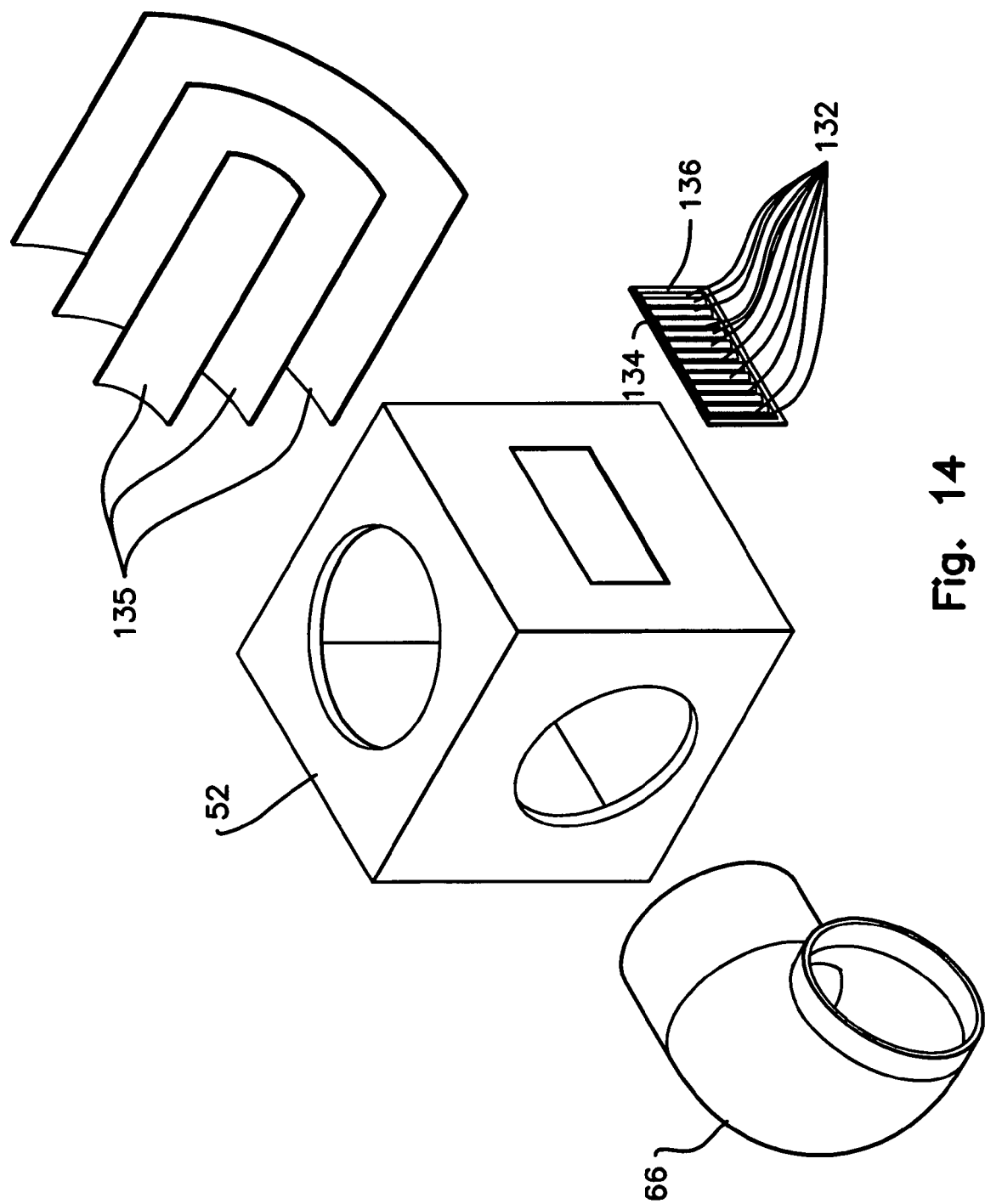
FIG. 14 is a exploded view of the smoke plenum box (52).

FIG. 14 is a exploded view of the plenum box (52) comprising a elbow duct (66), a plurality of smoke turning veins (135), a louver adjust lever (134) to control air flow into the plenum box (52) to tailor smoke opacity by adjusting the opening of the louvers (132), and a louver frame (136) used to house said louvers (132) onto a single shaft to be operated simultaneously by said louver adjust lever (134).

Figure 15:
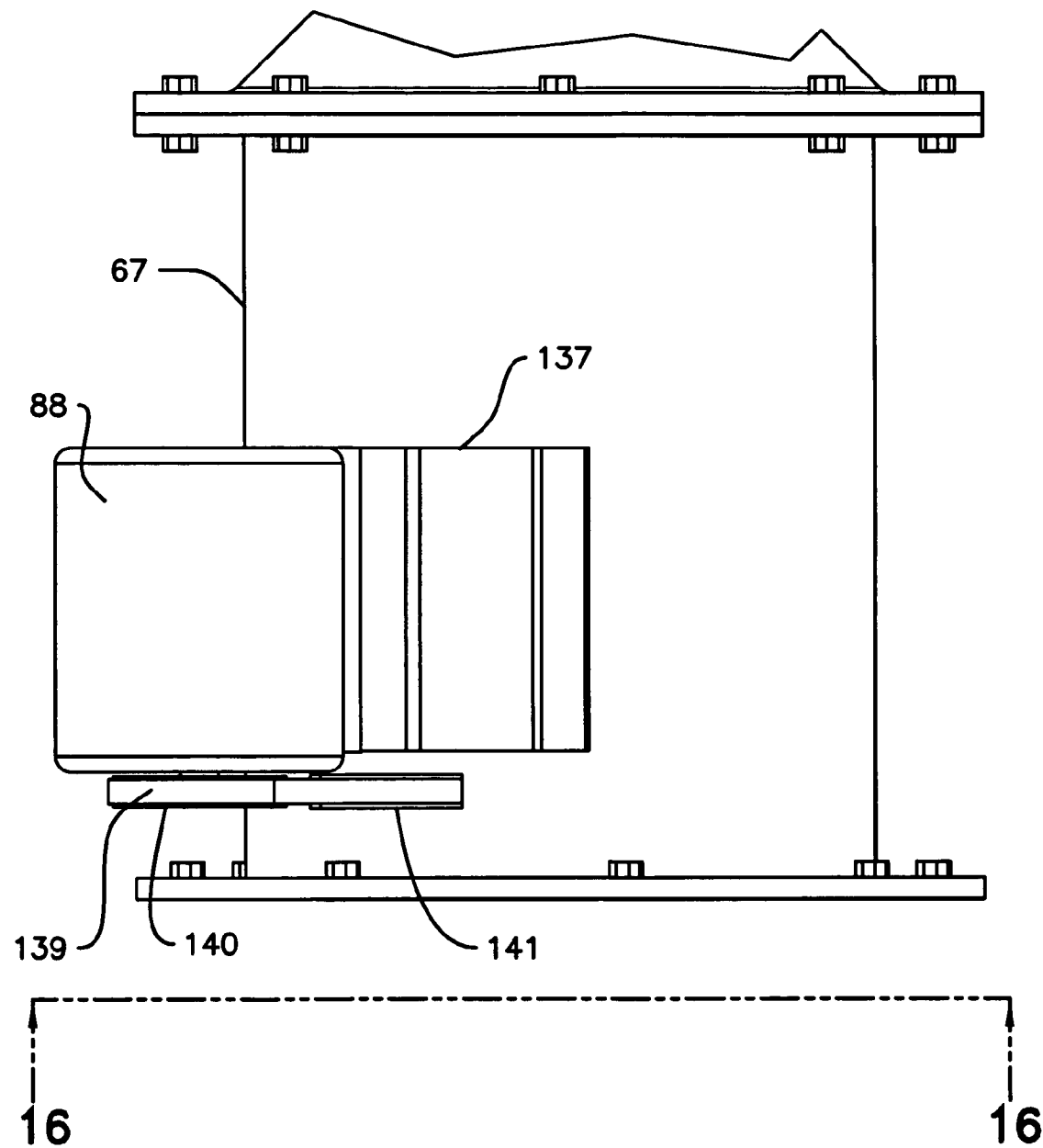
FIG. 15 is a front orthogonal view of the fan housing (67).

FIG. 15 shows a frontal orthogonal view of the fan housing (67) comprising a electric speed control motor (88), a motor mounting bracket (137), a belt (139), a pulley (140), and a belt slot (141).

Figure 16:
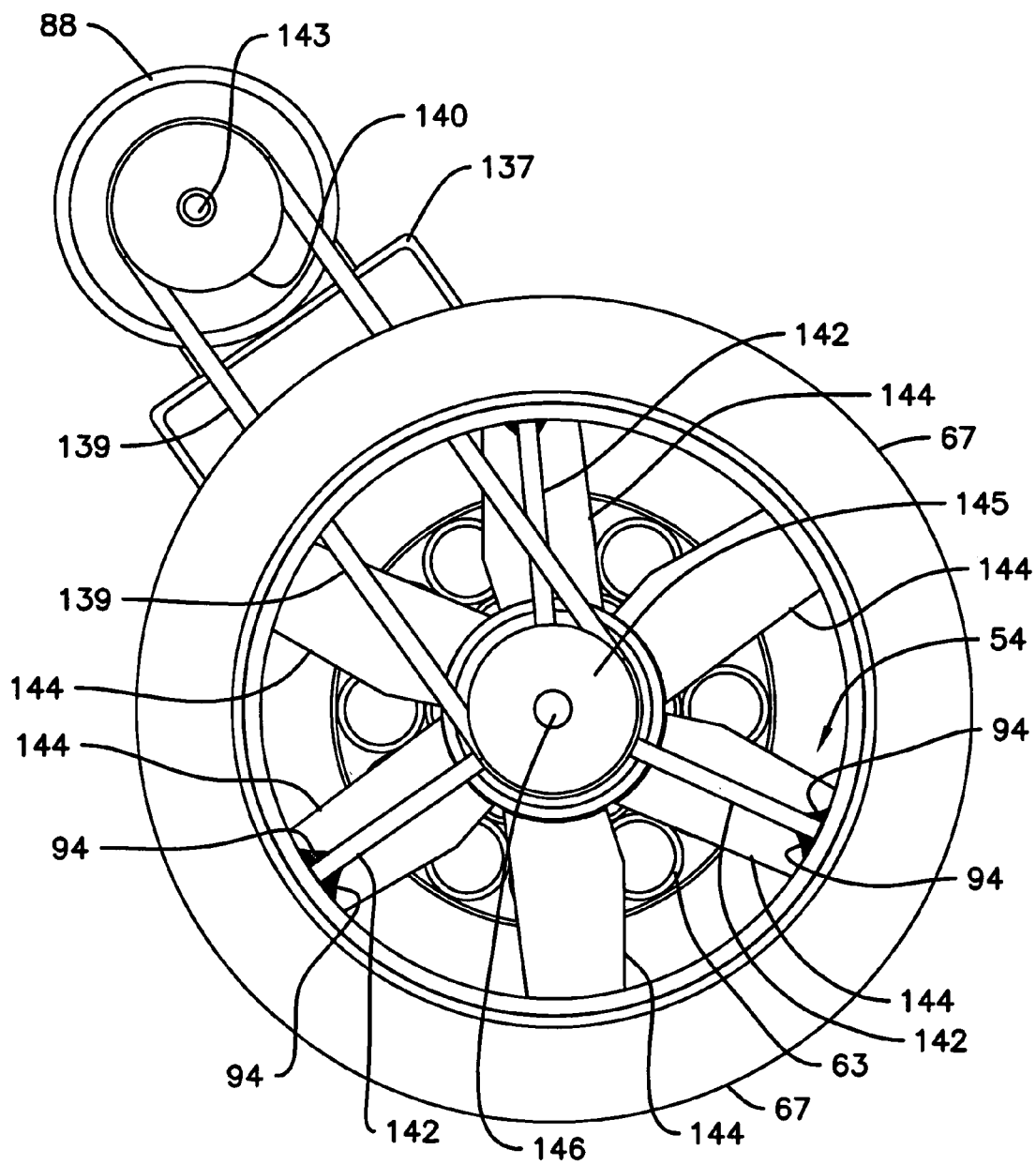
FIG. 16 is a bottom orthogonal view of the fan housing (67) taken from FIG. 15.

FIG. 16 is a bottom orthogonal view taken from FIG. 15 comprising a fan housing (67), a speed control fan assembly (54), fan blades (144), a electric speed control motor (88), a motor mounting bracket (137), a motor shaft (143), a fan shaft (146), a motor pulley (140), a belt (139) to transmit torque from said speed control motor (88) to said fan blades (144), a fan mounting bracket (142) welded (94) to the fan housing (67) to support the fan assembly (54), and a fan pulley (145). Also shown is the laminar flow tube assembly (63) positioned downstream of the fan assembly (54).

Figure 17:
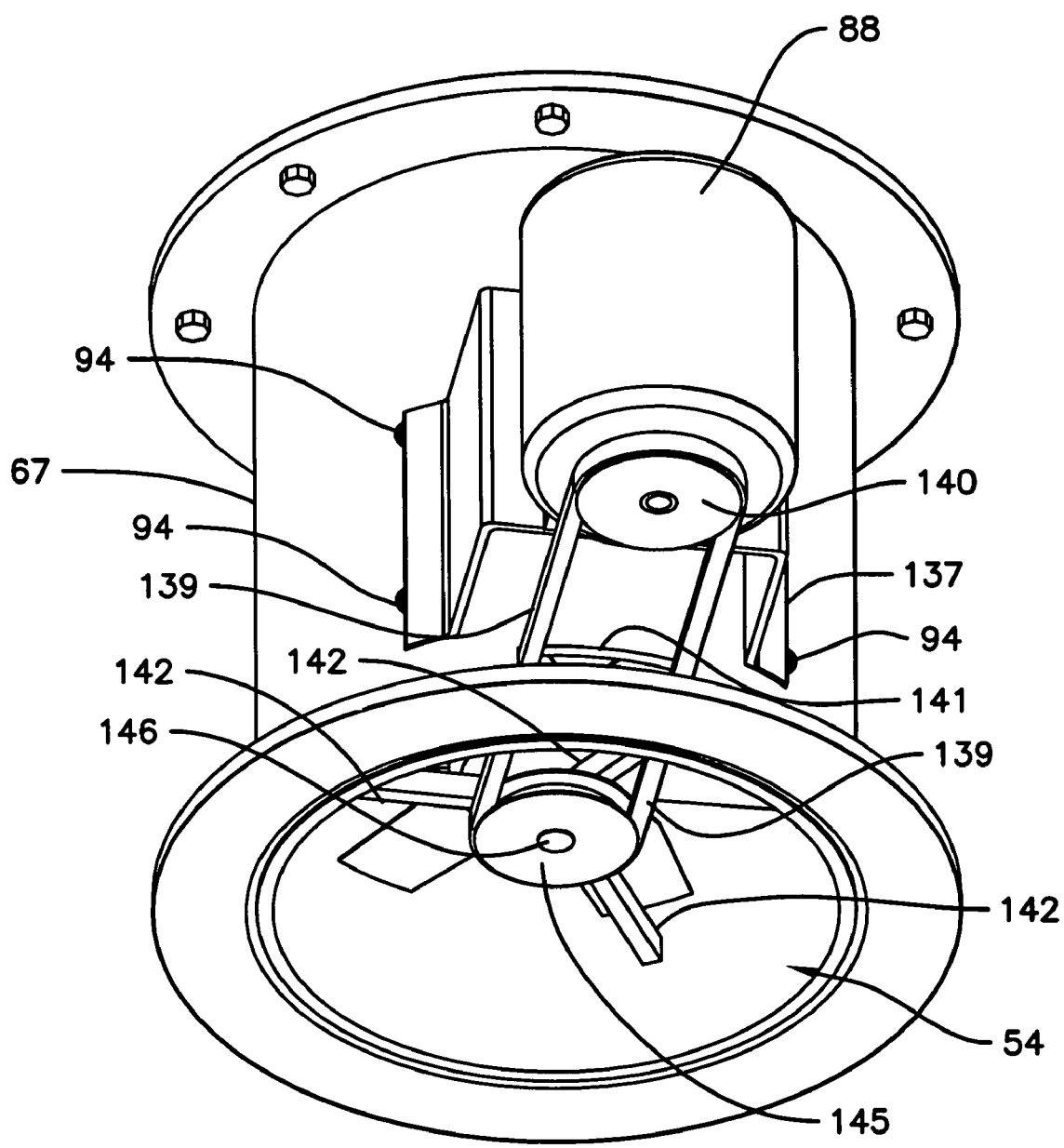
FIG. 17 is a bottom isolation view of the fan housing (67).

FIG. 17 is a bottom isometric view of FIG. 15 to further clarify the design of the fan mounting arrangement comprising a belt slot (141) cut into the wall of the extension duct (67) to connect said fan belt (139) to motor pulleys (140) and fan pulley (145), a fan assembly (54), comprising of a fan mounting bracket (142), welded (94) to the internal diameter of the extension duct (67) to support the fan assembly (54), a electric speed control motor (88) to achieve control of smoke (35) venting out of stack (44), and a motor mounting bracket (137) welded (94) outer wall of the extension duct (67) to support said speed control motor (88).

Figure 18:
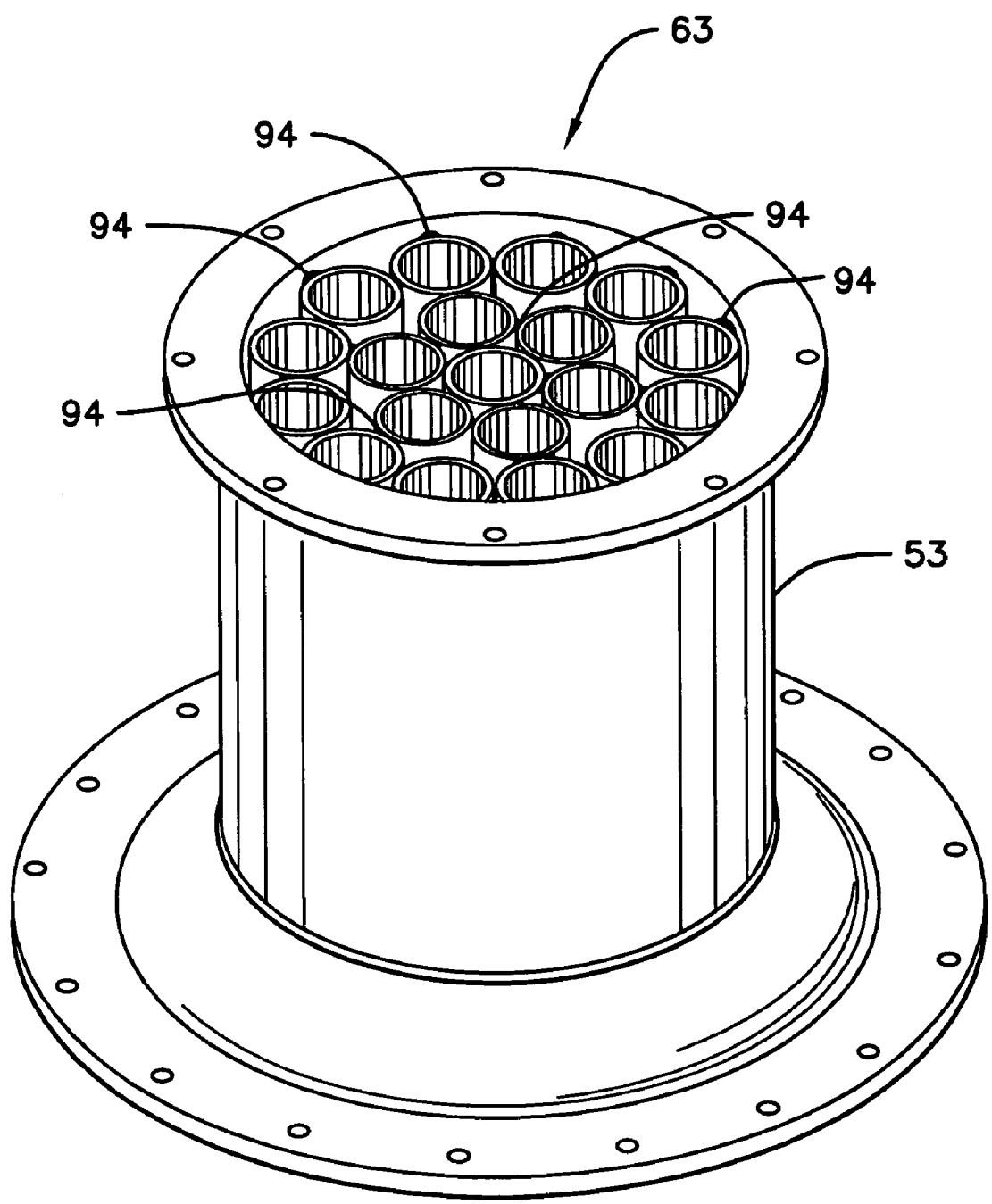
FIG. 18 is a top isometric view of the laminar flow housing (53).

FIG. 18 is a top isometric view laminar flow housing (53) comprising a laminar flow tube assembly (63) welded (94) to the inner wall of the laminar flow housing (53).

Figure 19:
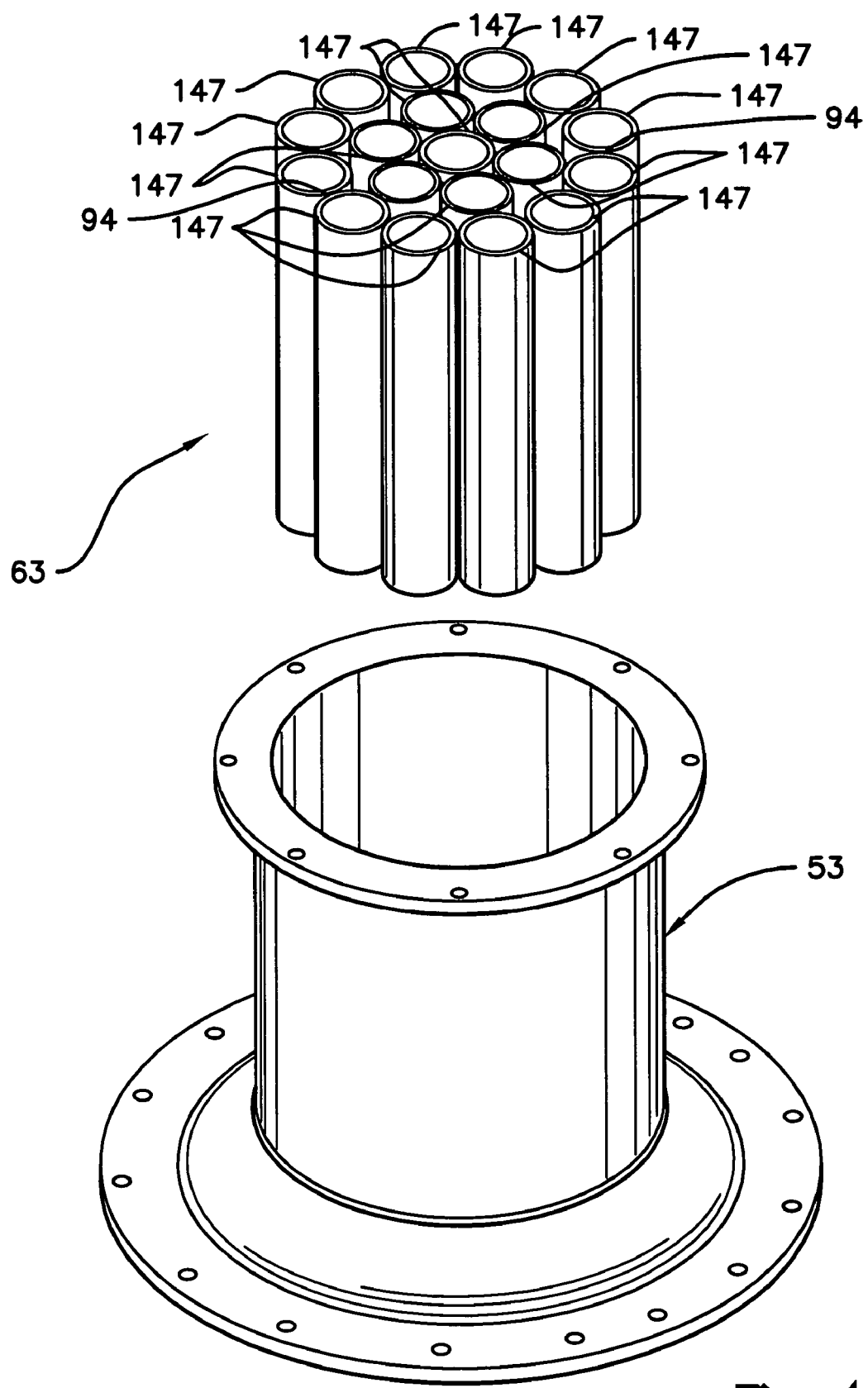
FIG. 19 is a exploded view of the laminar flow tube assembly (63).

FIG. 19 is a exploded view of the laminar flow housing (53) comprising a plurality of laminar flow tubes (147) welded (94) together to form a laminar flow tube assembly (63) which in turn is welded (94) to said laminar flow housing (53).

Figure 20:
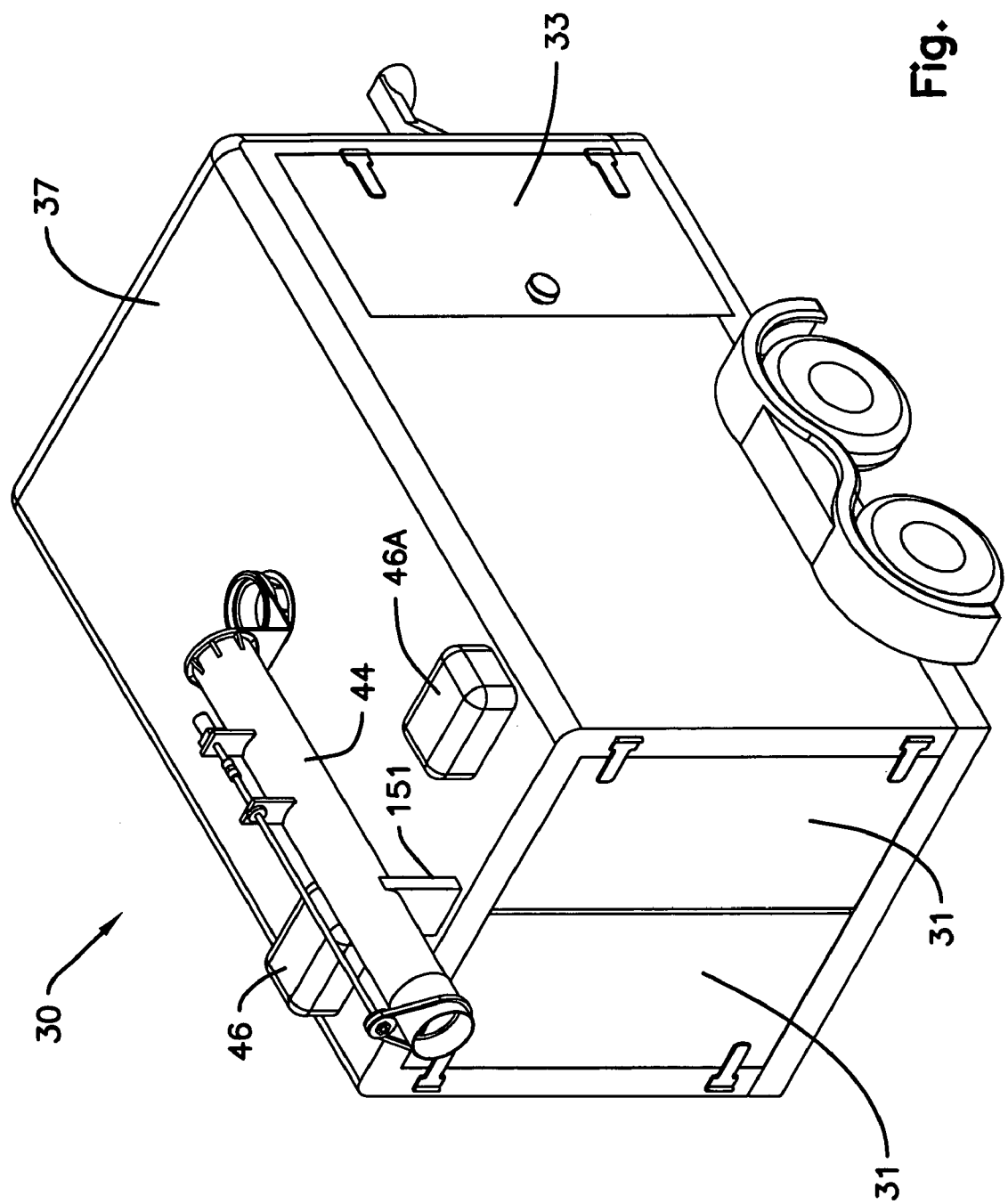
FIG. 20 is a top isometric view of the smoke generator (30) shown in the transportation mode with the stack (44) pivoted downwardly 90 degrees with the doors (31) and (33) closed.

FIG. 20 is a top isometric view of the smoke generator (30) shown in the transportation mode with doors (31) and (33) closed and with the stack (44) in the horizontal position resting on the stack cradle (151).

Figure 21:
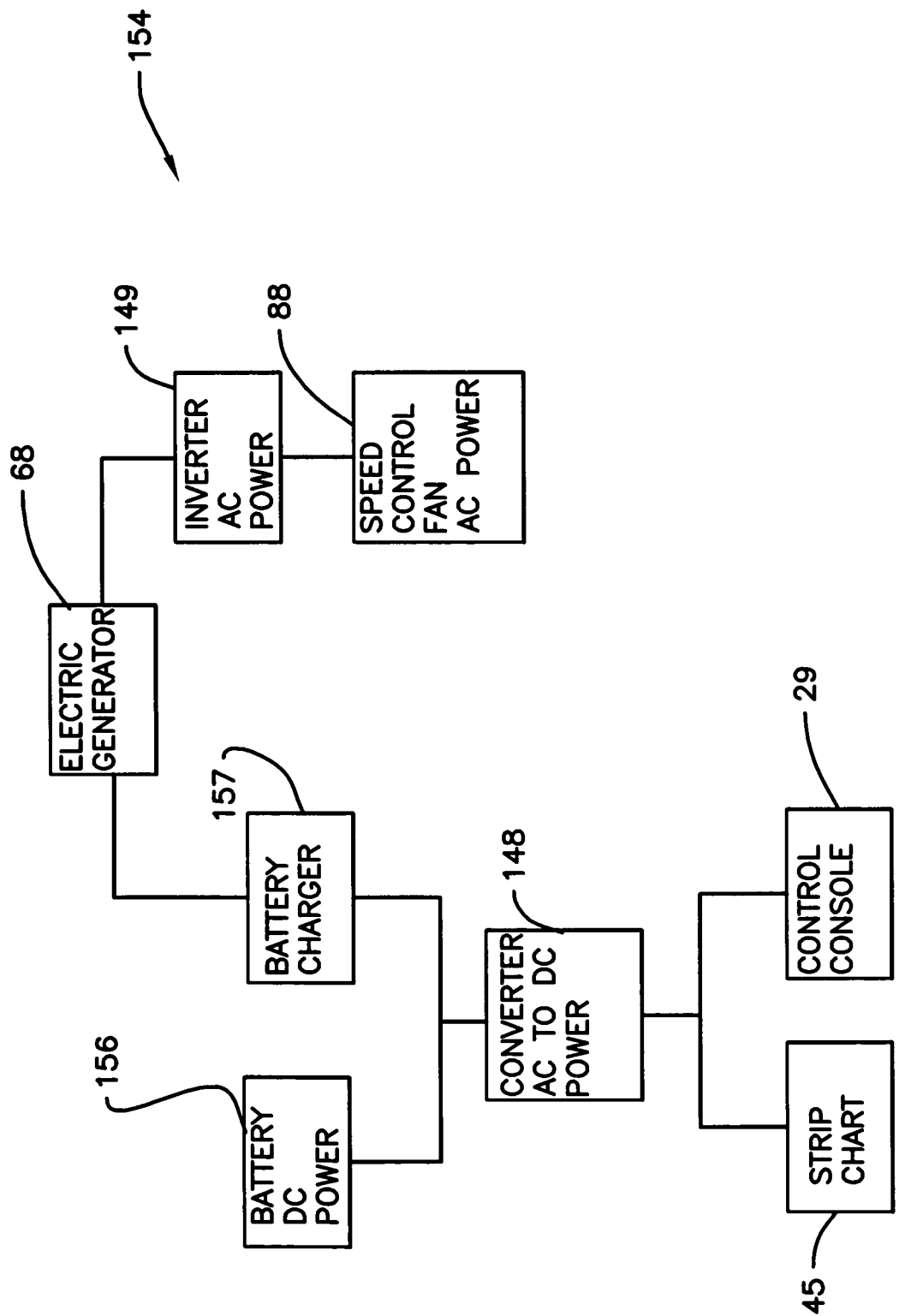
FIG. 21 is a block diagram of the electrical system (154) showing the inverter (149) used to power the electric speed control fan (88) the battery charger (148) used for supplying DC power to the battery (156) which supplies DC power to the converter to reduce DC voltage to the strip chart (45) and control console (29).

FIG. 21 is a schematic of the electric system (154) of the smoke generator (30) comprising an electrical generator (68) a inverter (149) a speed control fan (88) battery charger (157) a battery (156) a converter (148) a strip chart (45) and control console (29).

Said electric system (154) maintains electrical DC power to said strip chart (45) and control console (29) for at least thirty minutes with a fully charged battery (156) in the event said electrical generator (68) fails to meet the EPA electrical DC redundancy requirements for said electrical system (154).

Figure 22:
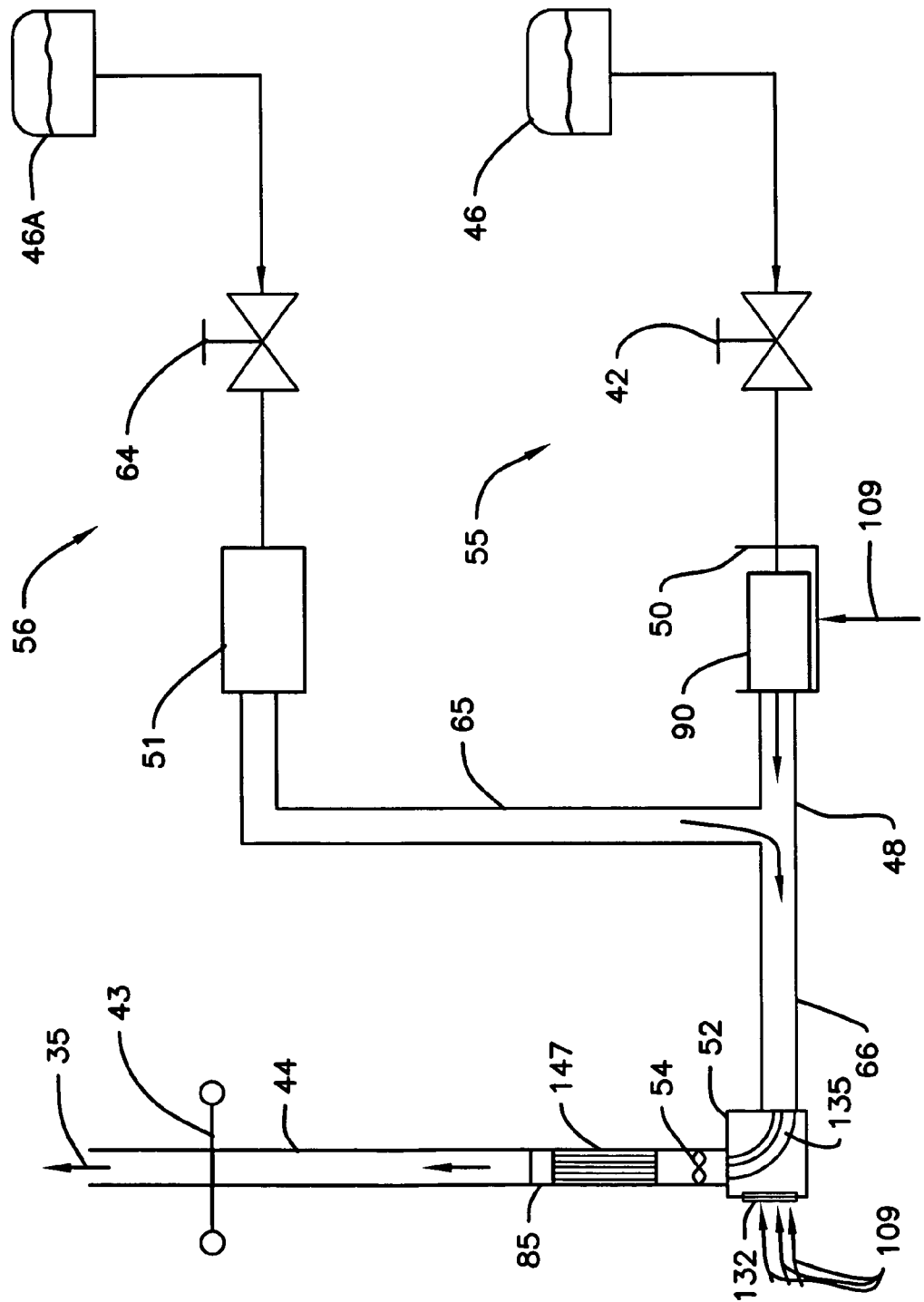
FIG. 22 is a schematic of the smoke generator system (30) showing the fuel tanks (46) and (46A) the needle fuel valve (42) and (64) the black smoke burn box (51) the white smoke burn box (50) the smoke plenum box (52) speed control fan (54) laminar flow tubes (147) photocell assembly (43) and smoke stack (44).

FIG. 22 shows a detailed flow schematic of the preferred embodiment illustrating the operation of the white smoke burn box (50), the black smoke burn box (51), the gravity-fed white smoke fuel system (55), the gravity-fed black smoke fuel system (56), the turning veins (135) in the smoke plenum box (52), the position of the speed control fan (54), the position of the laminar flow tubes (147), the photocell assembly (43), and smoke stack (44).

Said white smoke burn box (50), and said black smoke burn box (51) are operated independently and never jointly to prevent mixing white and black smoke (35). In the production of white smoke, said gravity-fed black smoke fuel system (56) is shut down by closing needle valve (64), and opening needle fuel valve (42). In the production of black smoke said gravity-fed white smoke system (55) is shut down by closing needle fuel valve (42) and opening needle valve (64). Said speed control fan (54) draws in air (109) through the aspiration holes (106) located in the white smoke generator assembly (90) and through the adjustment of louver (132) openings in said smoke plenum box (52) to combine with the smoke

(35) to customize the opacity of the smoke (35) venting out of said stack (44) to the atmosphere.

ALTERNATIVE EMBODIMENT

FIG. 23 shows an alternative embodiment of the smoke generator (30) contained in a enclosed self-contained automotive type vehicle (158) showing another means to transport said smoke generator (30).

Operation—FIGS. 3, 5, 6, 7, 7A, 7B, 9, 10, 10A, 11, 12, 13, 14, 15, 16, 17, 18, and 19

The operation of the smoke generator (30) is controlled by an operator (40) sifting at the control platform (41) who manually adjusts the needle fuel valves (42) and (64) to change the amount of fuel flowing to said white smoke burn pot (50) or said black smoke burn pot (51) thus changing the opacity of the smoke being produced. The opacity of the smoke (35) generated vents through said smoke stack (44). The opacity of the smoke (35) is measured by said photo-cell assembly (43), whereby said opacity readings are recorded on said strip chart (45) which are compared and graded against the observed visual readings by said personnel (35).

In operation, the white smoke generator assembly (90) shown in FIG. 10 accepts ignited butane gas (92) into butane inlet pipe (91) and flows through helical strip (105) thus generating a even distribution of flame (96), heating the center threaded pipe (110) and helical wire coil (104) evenly, thus raising the wire coil (104), to a flash point temperature of the diesel fuel (98). Upon contact of diesel fuel droplets (103) with the helical wire coil (104), white smoke (112) is generated. At least four aspirating holes (106) positioned on the outer wall circumference of the threaded spool (101) provide ambient air to the burning of said diesel fuel droplets (103) creating efficient burning of the fuel in the production of white smoke (112). Upon contact of said diesel fuel droplets (103) onto the heated helical wire coil (104), the capillary action of the diesel fuel droplets (103) takes place, spreading evenly along the full length of the helical wire coil (104), providing efficient burning of the diesel fuel droplets (103) and creating a uniform delivery of white smoke (112).

In operation, black smoke (129) is produced by toluene fuel (128) dripping onto heating element (126) with temperature set above the flash point of the toluene fuel (128). Baffle (125) permits black smoke (129) to accumulate in black smoke burn box (51) increasing the opacity of the smoke before flowing into said duct elbow (65).

The operation of the smoke generator (30) requires specific events to activate said smoke generator (30), control the varying opacity of the smoke (35) as well as changing the time intervals between opacity changes during the training session of personnel (38), and changing white smoke (35) to black smoke (35) midcourse during said training session.

The said events, and their subsequent results, in the production of smoke (35) follows:
a. Battery system (155) activated.
b. Strip chart (45) activated.
c. Speed control fan (54) activated to initiate a negative pressure downstream of said speed control fan (54).
d. Ignite flame (96) using butane gas (92) to heat the white smoke generator assembly (90). The butane gas is supplied from the butane gas supply bottle (34) connected to the butane inlet pipe (91).
e. The operator (40) opens needle valve (42) to initiate the flow of diesel fuel droplets (103) onto the heated helical wire coil (104) thus creating white smoke (112). During this process ambient air is drawn into the burning of the diesel fuel droplets (103) by the negative pressure created by the speed control fan (54) thus creating a more efficient burning of said fuel to generate white smoke (112).
f. White smoke (112) travels through the inlet manifold (48), and elbow duct (66) entering the smoke plenum box (52) drawn by the negative pressure created by the speed control fan (54).
g. The opacity of white smoke (112) is further controlled in the plenum box (52) by adjusting the openings of the said louvers (132), with said louver adjustment lever (134) to supply ambient air to mix with the white smoke (112).
h. Turning veins (135) in the plenum box (52) to provide for a smooth transition of the white smoke (112) flowing through the plenum box (52) to the speed control fan (54).
i. The RPM of the speed control fan (54) is monitored and controlled by the operator (40) to control the flow of white smoke (112) venting out of the stack (44).
j. White smoke (112) flowing on the downstream side of the speed control fan (54) enters the laminar flow tube assembly (63) to establish laminar flow and a even distribution of white smoke (112) passing through the diameter of smoke stack (44), and across the photo-cell assembly (43).
k. The photocell assembly (43) reads the true opacity of white smoke (112) by passing a light source from one end of the photocell assembly (43) across to the collector at the other end of the photocell assembly (43) crossing through the smoke stack (44). The opacity readings across the smoke stack (44) are transmitted to the strip chart (45) for a permanent record of the opacity data for subsequent comparison of the visual readings of said smoke (35) opacity readings made by the personnel (38).
l. White smoke (112) exiting said smoke stack (44), is silhouetted against the background screen (57) to enhance opacity viewing of white smoke by personnel (38). The background screen (57) is of different colors, dark for white smoke (112) and a lighter color for black smoke (129).
m. A wind directional indicator (61) placed on the top of trailer cab (37) is used to align the stack elbow (60) and background screen (57) with the prevailing wind direction to minimize the disturbance of the flow of smoke exiting the smoke stack (44). During the alignment the stack elbow (60) is free to rotate 360° within the boot seal (78). In operation, the stack elbow (60) is rotated by an electric motor (73), belt (77) and electric motor belt drive system (59).
n. During transportation of the smoke generator (30) the stack (44) is placed into the horizontal position resting on cradle (151). A pivot hinge (150) plate is welded to the bottom of the smoke stack (44) permitting the smoke stack (44) to pivot around the hinge pin (152) to be lowered 90° into the cradle (151).
o. Changing out the photocell filter in the prior art design has always been a problem because it was positioned deep inside the smoke stack (7) making it hard to reach by its position high above in the smoke stack (7), requiring a long probing rod and a ladder to reach it. The new preferred embodiment places the photocell assembly in the trailer cab (37) with the photocell box (23) housing welded to the photocell tube arm (27) thus placing the photocell filter (28) within arm's reach to replace the filter (28), a improvement over prior art. Frequent replacing of the photocell filter (28) is required because of soot contamination from the smoke being vented through the smoke stack (44).

CONCLUSION, RAMIFICATIONS, AND SCOPE

Accordingly, the reader will see that the preferred embodiment of the smoke generator (30) is an improved design over of the prior art smoke generator by integrating the smoke generator system and the control center into a single trailer, thus protecting the system, and all of its components, from exposure to the elements, as well as providing a improved means of transportation. The prior art required the tandem transportation of the open trailer and the control center trailer, creating a safety issue.

In addition, the preferred embodiment includes improved design changes which are the basis of the claims. The design changes include a single trailer to house the control room and the component room, the white smoke box, black smoke box, the smoke plenum box, the incorporation of the speed control fan, thus eliminating the centrifugal squirrel blower used in the prior art, laminar flow housing incorporating a plurality of tubes, repositioning of the photocell assembly to be within the trailer to ease the replacement of the filter, the welding of the filter box within the photocell tube arm, the gravity-fed fuel system, and the addition of a safety circuit for automatically switching to battery power, in the event the gasoline powered electric generator fail.

While the preferred embodiment of the present invention has been shown and described, it will be apparent to those skilled in the art that many changes and modifications may be made without departing from the invention in its broader aspects. Accordingly, the scope of the invention should be determined not by the embodiments illustrated, but by the appended claims and their legal equivalent.

We claim:

1. A smoke generator (30) for the production of white and black smoke (35), comprising:
    (a) a vehicle (37) to house a smoke generator (30) components
    (b) a white smoke burn box (50) to produce white smoke (35)
    (c) a black smoke burn box (51) to produce of black smoke (35)
    (d) a smoke plenum box (52) to control smoke (35) turbulence
    (e) a speed control fan assembly (54) contained within a fan housing (67)
    (f) a laminar flow tub assembly (63) welded (94) to the inner wall of a laminar flow housing (53)
    (g) a photocell assembly (43) to measure the smoke (35) opacity
    (h) a stack elbow (60) to direct the smoke (35) horizontally with the direction of the prevailing wind
    (i) a electric motor belt drive system (59) to rotate a stack elbow into the direction of a prevailing wind comprising an electric motor (73), a drive shaft (72) to transmit electric motor (73) torque to rotate stack ring (83), a coupling (76) to compensate for drive shaft (72) misalignment, brackets (75) to guide said drive shaft (72), and a pulley disc (74) to mount belt (77)
    (j) a gravity-fed white smoke fuel system (55) to supply diesel fuel (98) to said white smoke burn box (50)
    (k) a gravity-fed black smoke fuel system (56) to supply toluene fuel (128) to said black smoke burn box (51)
    (l) a background screen (57) to enhance visual contrast of said smoke (35) opacity
    (m) said background screen (57) contiguously attached by welds (94) to said stack ring (83) by at least two rods (82)
    (n) a wind directional indicator (61) to visually determining the direction of the prevailing wind
    (o) an electric system connecting a control console and all other electrical components, comprising an electrical generator and an electrical DC power supply comprising an initially fully charged battery to supply at least thirty minutes of power in case of failure of said electrical generator.

2. The smoke generator (30) as recited in claim 1 wherein a trailer cab (37) comprising:
    (a) a control room (36) to house electronic components for controlling production of white and black smoke (35)
    (b) a component room (32) to house mechanical components for production of white and black smoke (35)
    (c) a wall (39) to separate said control room (36) from the component room (32)
    (d) a plurality of windows (69) for visual inspection of said component room (32)
    (e) at least one door (31) for access to components from said component room (32)
    (f) at least one door (33) to access control room (36).

3. The white smoke generator (30) as recited in claim 1 wherein the white smoke burn box (50) comprise;
    (a) a threaded tube cover (99) to attach the threaded spool (101) and center threaded pipe (110)
    (b) a centering web (95) to center the butane inlet pipe (91)
    (c) a extension tube (93) to center said butane inlet pipe (91)
    (d) a threaded spool (101) to join said threaded tube cover (99) with outer threaded tube housing (100)
    (e) a plurality of aspiration holes (106) to provide ambient air for efficient burning of fuel
    (f) a helical wire coil (104) provides a means to distribute diesel fuel (98) over said helical coils (104) for even burning.
    (g) a center threaded pipe (110) to provide even distribution of heat to the helical wire coil (104.
    (h) a helical strip (105) to generate a even distribution of flame (96) to evenly heat said center threaded pipe (110)
    (i) a outer thread tube housing (100) to house said helical wire coil (104) said center threaded pipe (110) said helical strip (105) respectively.

4. The smoke generator (30) as recited in claim 1 wherein a black smoke burn box (51) comprising:
    (a) at least two baffles (125) to accumulate black smoke (129).

5. The smoke generator (30) as recited in claim 1 wherein a smoke plenum box (52) comprising:
    (a) at least three turning veins (135) to minimize the flow of smoke turbulence
    (b) at least ten louvers (132) to adjust smoke (35) opacity with added air flow.
    (c) a louver frame (136) to house said louvers (132).
    (d) a louver adjustment lever (134) to adjust said louvers (132) opening simultaneously.

6. The smoke generator (30) as recited in claim 1 wherein a fan housing (67) comprising:
    (a) a fan belt (139) to transmit torque from said speed control motor (88) to said fan blades (144)
    (b) a belt slot (141) to connect fan belt (139) to motor pulleys (140) and fan pulley (145)
    (c) a speed control fan (54) to attain enhanced flow control of smoke venting out through stack (44)
    (d) a fan mounting bracket (142) to support the fan assembly (54)

(e) a speed control motor (88) to synchronize the flow of smoke (35) with the speed control fan (54)

(f) a motor mounting bracket (137)) to support said speed control motor (88).

7. The smoke generator (30) as recited in claim 1 wherein said laminar flow housing (53) comprising:
   (a) a laminar flow tube assembly (63) to establish laminar flow distribution of smoke (35) across smoke stack (44)
   (b) a plurality of laminar flow tubes (147) to improve smoke distribution thereby decreasing smoke (35) turbulence across smoke stack (44).

8. The smoke generator (30) as recited in claim 1 wherein said photocell assembly (43) comprising:
   (a) a photocell tube arm (27) and (27A) to provide a non-obstructed flow path of smoke (35) flowing through the lower stack (85) and smoke stack (44)
   (b) a filter box (23) positioned on photocell tube arm (27) within arm's reach of the operator (40) to replace of photocell filter (28).

9. The smoke generator (30) as recited in claim 1 wherein said stack elbow (60) comprising:
   (a) at least three turning vanes (133) to minimize turbulent flow of smoke (35) venting through said stack elbow (60)
   (b) at least two rods (80) to mount background screen (57) to the side of said stack elbow (60)
   (c) a centering shaft (84) to position said stack elbow (60) concentric with smoke stack (44) center line (131)
   (d) a centering hole (126) to guide said centering shaft (84) to lower centering hole (122).

10. The smoke generator (30) as recited in claim 1 wherein said electric motor belt drive system (59) comprising:
    (a) a electric motor (73) to rotate stack elbow (60) and stack ring (83)
    (b) a drive shaft (72) to transmit said electric motor (73) torque
    (c) a coupling (76) to compensate for the misalignment of said drive shaft (72)
    (d) a boot seal (78) to seal the joint between said stack elbow (60) and smoke stack (44) to transmit torque to rotate said stack elbow (60) and stack ring (83)
    (e) a mounting bracket (75) to guide said drive shaft (72)
    (f) a belt (77) to transmit torque to rotate said stack elbow (60) and stack ring (83)
    (g) a pulley disc (74) to connect belt (77) and boot seal (78) to transmit torque to rotate said stack elbow (60) and said stack ring (83).

11. The smoke generator (30) as recited in claim 1 wherein said gravity-fed white smoke system (55) comprising:
    (a) a fuel tank (46) to supply fuel to the white smoke generator (90)
    (b) a fuel tank (46) positioned above trailer cab (37) to provide head pressure to distribute of fuel to said gravity-fed white smoke system (55).

12. The smoke generator (30) as recited in claim 1 wherein said gravity-fed black smoke system (56) comprising:
    (a) a fuel tank (46A) to supply fuel to the black smoke burn box (51)
    (b) a fuel tank (46A) positioned above trailer cab (37) to provide head pressure to distribute fuel to said gravity-fed black smoke system (56).

13. The smoke generator (30) as recited in claim 1 wherein said background screen (57) comprising:
    (a) a checkered surface (118) to enhance the visual contrast of the smoke (35) opacity
    (b) a substantially curved (130) surface to enhance the visibility of smoke (35) opacity.

14. The smoke generator (30) as recited in claim 1 wherein said stack ring (83) comprising:
    (a) at least two attachment rods (82) to mount said background screen (57) to the side of said stack ring (83)
    (b) a top centering web (79) to center and align said centering shaft (84)
    (c) a centering shaft (84) to position said stack ring (83) concentric with smoke stack (44) center line (131).

15. The smoke generator (30) as recited in claim 1 wherein said electric system (155) comprising:
    (a) a battery (156) to power the electronics of the smoke generator (30)
    (b) a battery charger (157) to charge said battery (156)
    (c) a converter (148) to convert AC voltage to DC voltage.

* * * * *